Dec. 3, 1968     E. S. PERKINS ET AL     3,414,901
AIRCRAFT NAVIGATION SYSTEM
Filed May 31, 1966     5 Sheets-Sheet 1
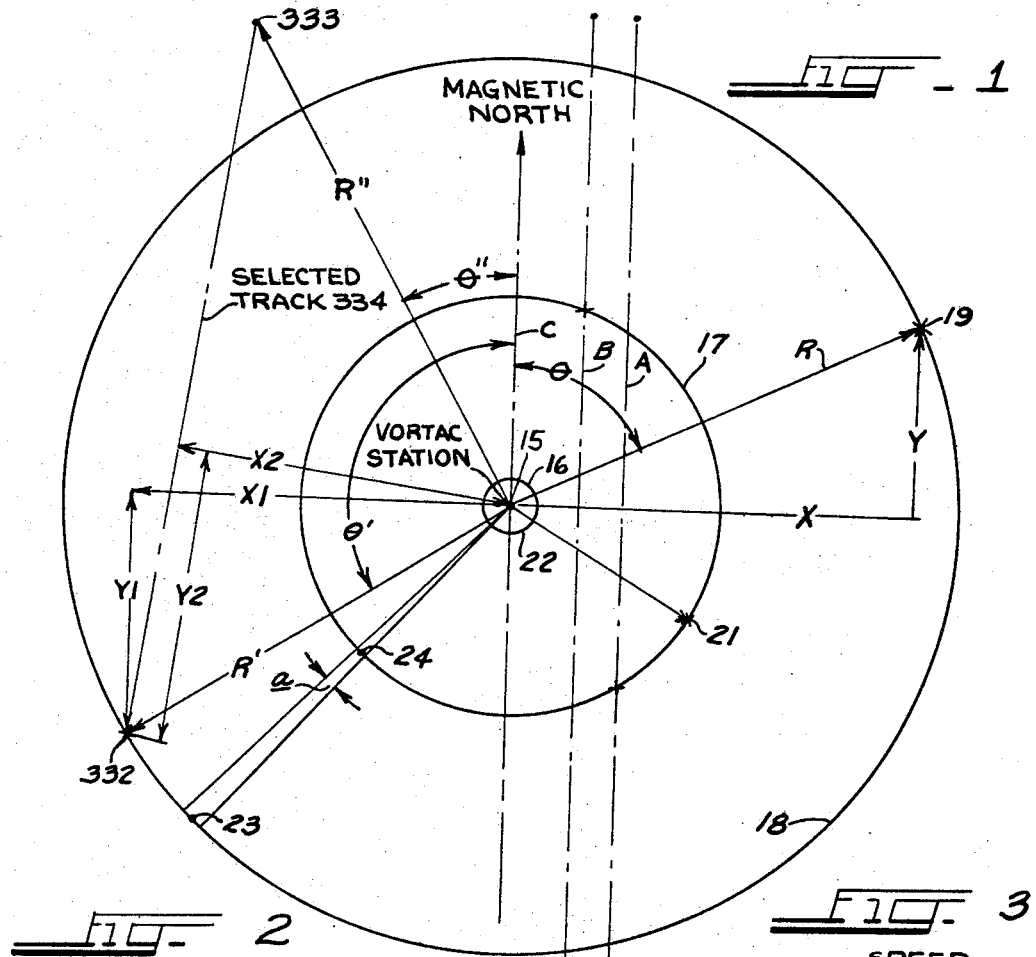
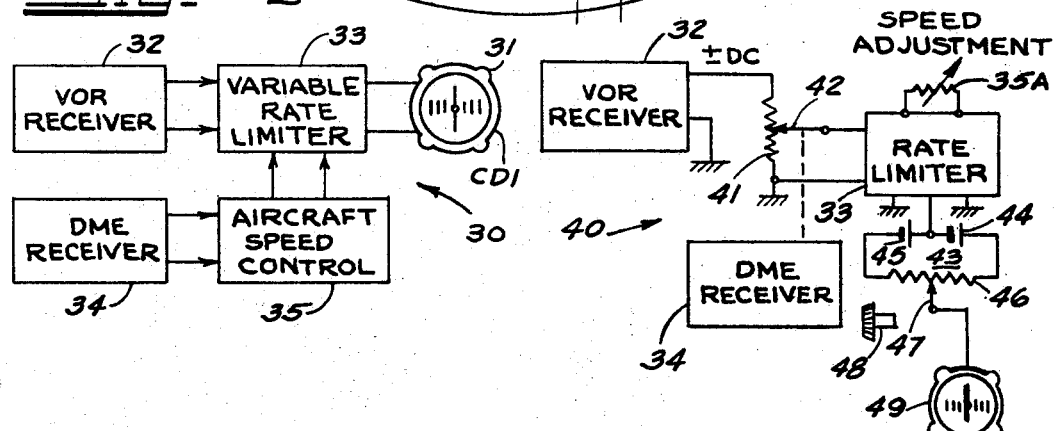
INVENTORS
EARL STUART PERKINS
MYRON L. ANTHONY
BY Wallace, Kinzer & Dorn

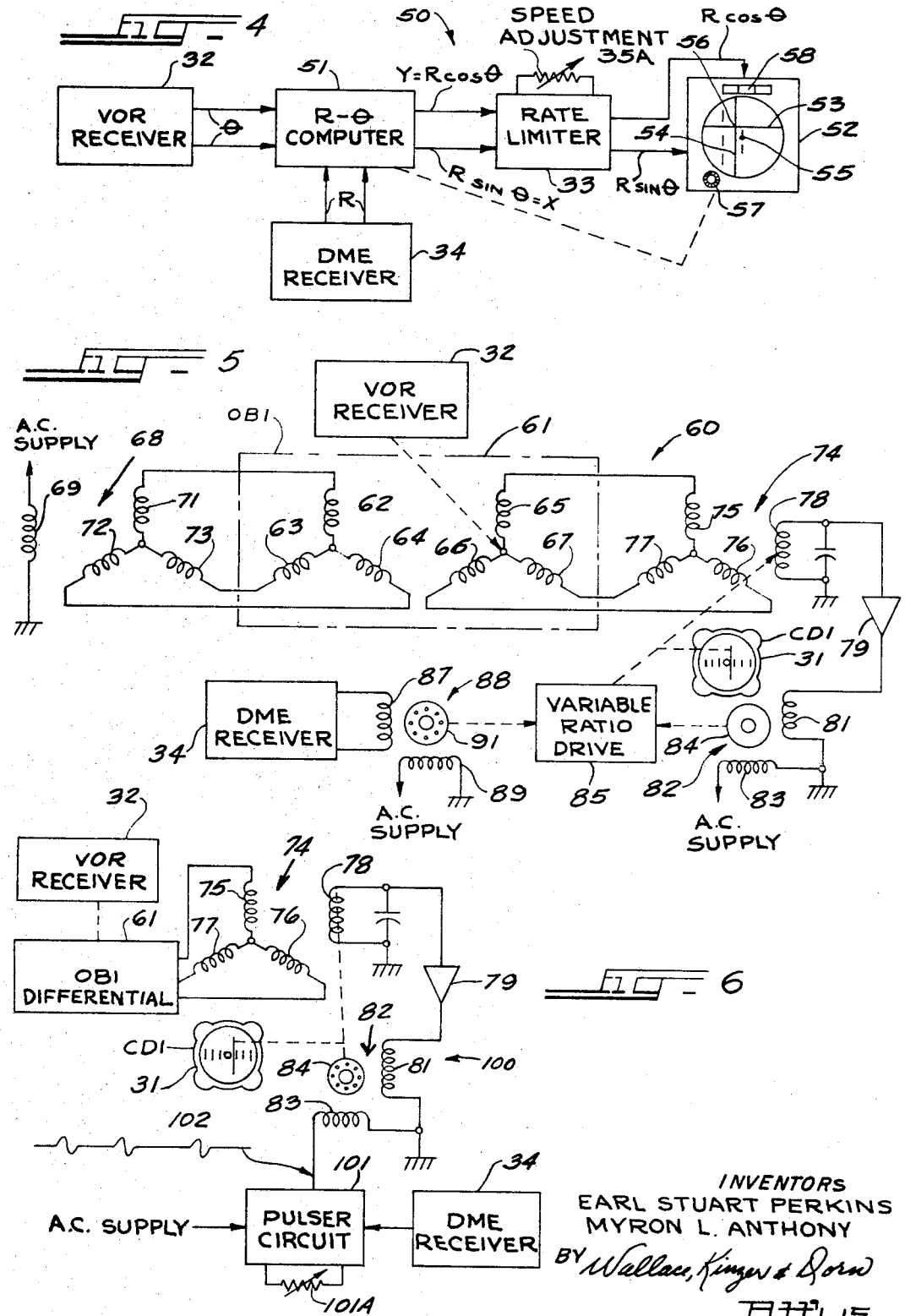

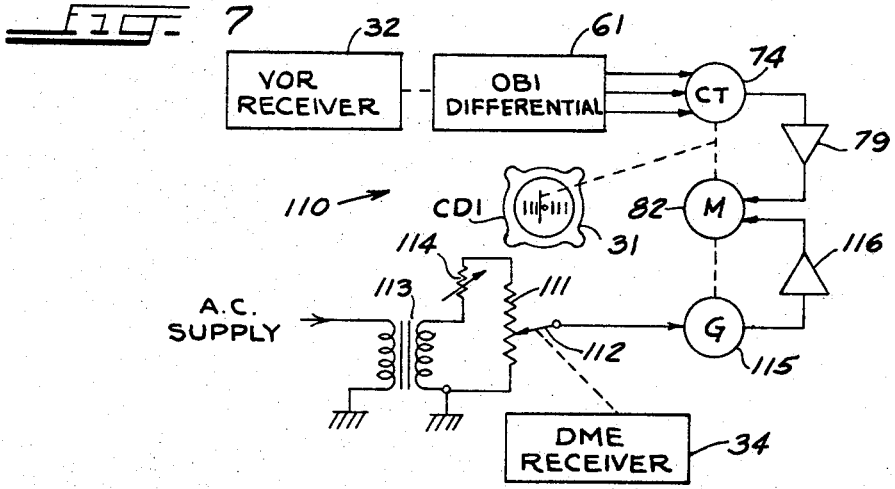
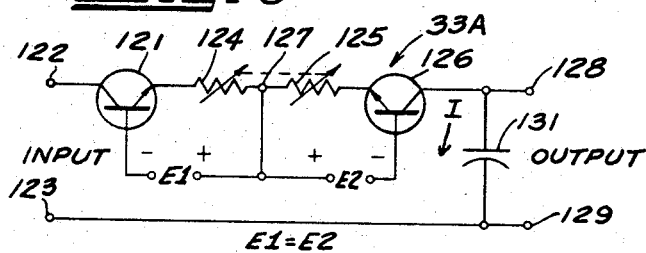
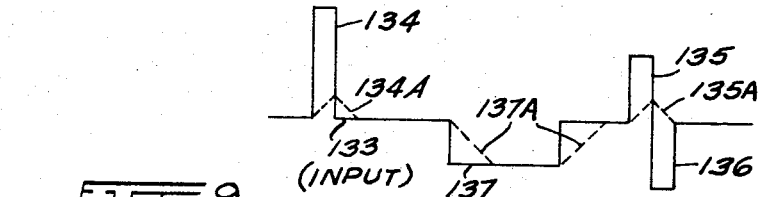
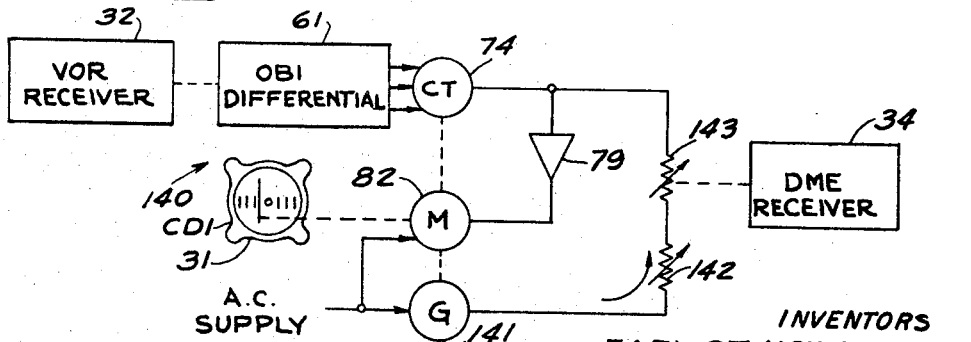
INVENTORS
EARL STUART PERKINS
MYRON L. ANTHONY

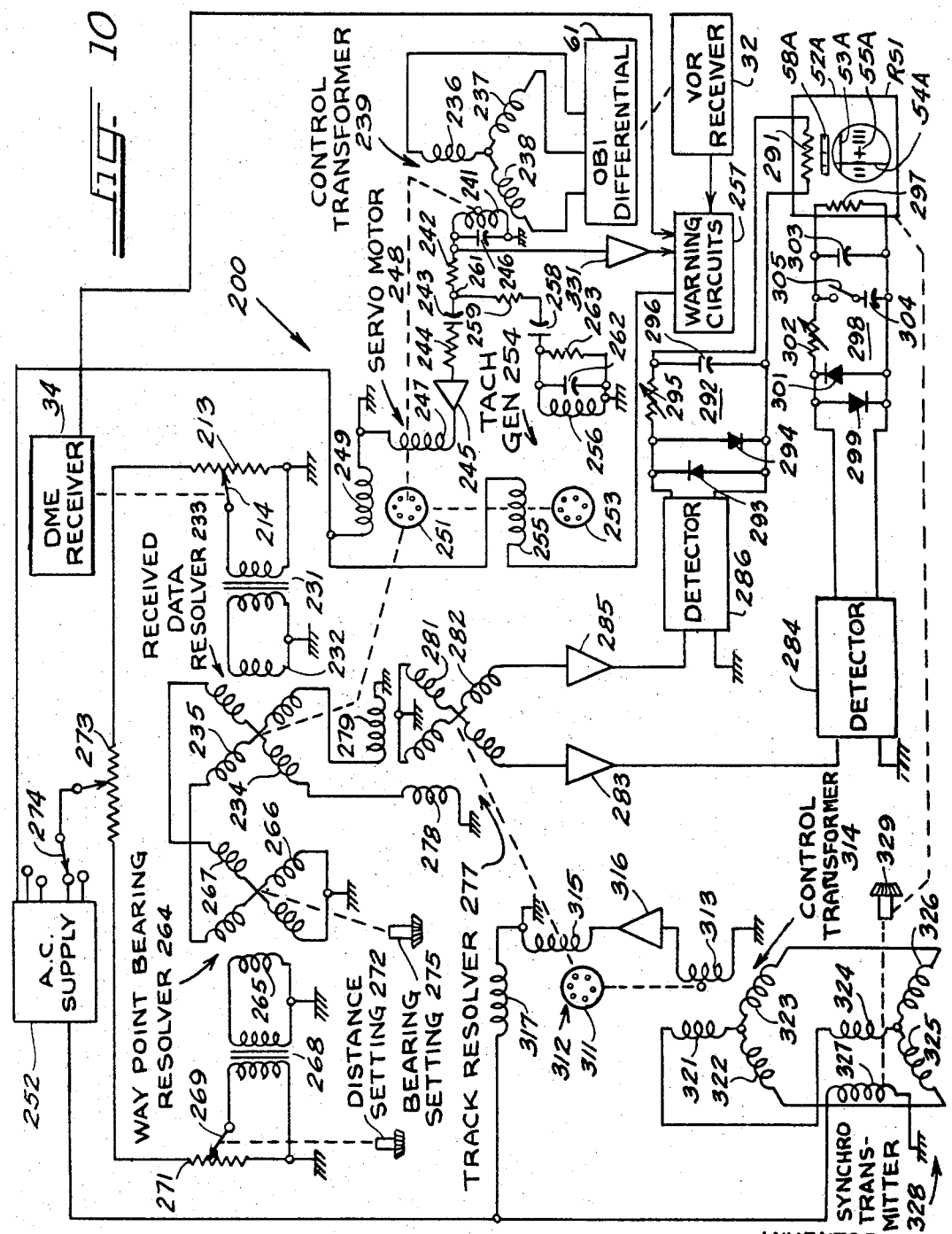

INVENTORS
EARL STUART PERKINS
MYRON L. ANTHONY
BY Wallace, Kinzer & Dorn
ATTYS.

United States Patent Office 3,414,901
Patented Dec. 3, 1968

3,414,901
AIRCRAFT NAVIGATION SYSTEM
Earl Stuart Perkins, Oak Brook, and Myron L. Anthony, La Grange, Ill., assignors, by mesne assignments, to Butler National Corporation, New Hope, Minn., a corporation of Delaware
Filed May 31, 1966, Ser. No. 559,650
35 Claims. (Cl. 343—107)

ABSTRACT OF THE DISCLOSURE

An aircraft navigation system, using bearing and distance signals from a remote navigation station, in which the response rate of the navigation indicator instrument is limited in accordance with maximum ground speed of the aircraft and inversely in accordance with the distance of the aircraft from the station. In the preferred form, the airborne equipment includes a bearing signal receiver (VOR) and a distance signal receiver (DME) both coupled to a computer or other signal-compounding device. One form of computer employs a rotary resolver that combines the bearing and distance signals to develop a displacement signal representative of displacement of the aircraft from a given track. An additional way-point resolver may be utilized, with the indicator instrument showing the aircraft position in terms of rectilinear coordinates relative to an arbitrary way point not necessarily coincident with location of the navigation station. Several forms of specific rate-limiting circuits and devices are shown in variation of the system, including particular servo devices and constant-current limiters. Rate limitation is effected before or after signal compounding. One modification includes an adjustable phase-lock circuit incorporated in the bearing signal receiver and controlled by the distance signal receiver. One form of safety catch-up circuit, allowing a short-term increase in the response rate of the indicator, is disclosed.

---

This invention relates to a new and improved aircraft navigation system and to the components of such a system. The invention is particularly advantageous in utilizing the navigation signals from a conventional VORTAC or TACAN station, and is described in that connection, but includes several features equally applicable to different forms of navigation signals.

The signals radiated from conventional VORTAC and TACAN stations provide essentially complete information, with respect to both distance and bearing, for aircraft navigation. But conventional techniques and apparatus for using those signals have not been uniformly successful, partly because of apparent difficulties in signal detection and partly through failure to restrict use of the signals to the truly significant information they contain.

As received at an aircraft, these navigation signals, and particularly the VOR bearing signals, usually exhibit some "roughness" or "pointer swing." Typical VOR signals from stations within line of sight of the aircraft may exhibit oscillations of one-half to one degree at frequencies of one to twenty cycles per minute. This roughness is usually fairly constant at any practical distance for utilization of the station in navigation of the aircraft. But a number of the presently available VORTAC facilities produce rather extreme signal roughness, referred to in some instances as "scallops," of as much as plus or minus ten degrees or more, even on a highly-damped indicator. These erratic indications render the navigation signals, particularly the bearing signals, virtually useless in conventional aircraft navigation equipment, and have resulted in issuance of regulations excluding the use of many of the individual station facilities, on at least some radials, for navigation purposes.

Using conventional polar coordinate navigation techniques, the VOR bearing signals radiated by a VORTAC or TACAN station vary directly in their precision in proportion to the distance of the aircraft from the radiating station. Thus, the distance subtended by a given angle varies directly with distance from the station radiating bearing information; an arc of one degree subtends a chord of approximately two miles at a distance of one hundred fifteen miles from the station but only one-tenth of a mile or approximately five hundred feet at a distance of six miles from the station. It is thus seen that, as the distance from a station decreases, the weight or effect of variations in the bearing signal on accuracy of positioning of the aircraft becomes less and less important. Directly over the radiating station, the bearing signal has virtually no effect on position accuracy.

Using conventional polar coordinate navigation equipment, the standard course deviation instrument calibration is plus or minus ten degrees, a total of twenty degrees across the full travel of the left-right pointer, which is usually of the order of one inch. Thus, the scale factor of the instrument is such that full deviation covers a range of forty miles at a distance of one hundred fifteen miles from the radiating station. At such a distance, the width of the pointer on the instrument itself usually covers a span of approximately two and one-half miles. With the normal amount of jittering movement of the pointer, one pointer width, representative of two and one-half miles course deviation, is difficult for the pilot to discern. Continuous monitoring on the part of a good autopilot coupler achieves, at best, control over a swing of approximately five miles.

On the other hand, when the aircraft is at a distance of only about six miles from the radiating station, the conventional course deviation instrument represents a track width of only two miles, full scale, and small motions of the aircraft produce very substantial pointer movements. But none of the information presented bears any direct relation to the speed of the aircraft. And no effective control of the instrumentation is achieved in relation to distance from the navigation signal radiating station.

Properly treated, the information available from conventional VORTAC and TACAN navigation stations can be utilized for parallel track navigation of high precision comparable to that achieved with radar control. To achieve this end, it is necessary to compensate effectively for the distance of the aircraft from the radiating station and to eliminate the effect of the roughness or "scallops" in received bearing signals. It is a principal object of the present invention to enhance both the accuracy and the usability of the bearing information available from conventional VOR signals by eliminating the overall effect of signal roughness and scallops and other signal perturbations.

Another important object of the invention is to extend the usefulness of presently available VOR stations by utilization of aircraft instrumentation that is directly related, in its response rate, to the navigational needs of the aircraft, including particularly the operating speed of the aircraft.

Another critical object of the invention is to afford a new and improved aircraft navigation system that is effectively and inherently self-adjusting to compensate for changes in distance from a VOR station.

A specific object of the invention is to afford a new and improved aircraft navigation system that provides for variation in the slewing rate of servos incorporated in the system to improve system response relative to the navigational needs of the aircraft, including both aircraft speed and distance from a controlling station.

Another specific object of the invention is to provide means for eliminating the effects of roughness or scallops in a received bearing signal both prior to and after encoding of the signal as the signal is utilized in a navigation system based on rectilinear coordinates.

Another object of the invention is to afford a new and improved area navigation system employing rectilinear coordinates, in contrast with conventional polar coordinates, that is capable of providing high accuracy while utilizing conventional bearing and distance signals from available VORTAC and TACAN stations.

A further object of the invention is to provide a multiple parallel track navigation system, utilizing the available signals from conventional VORTAC stations, that is not disturbed by scallops and other signal perturbations which may render the stations unusable in known polar coordinate navigation systems.

Another object of the invention is to afford a new and improved rectilinear area navigation system, based upon the bearing and distance signals available from a conventional VORTAC or TACAN station, that is relatively low in cost, light in weight, and compact in size.

Other and further objects of the present invention will be apparent from the following description and claims and are illustrated in the accompanying drawings, which by way of illustration, show preferred embodiments of the present invention and the principles thereof and what is now considered to be the best mode contemplated for applying these principles. Other embodiments of the invention embodying the same or equivalent principles may be made as desired by those skilled in the art without departing from the present invention.

In the drawings:

FIG. 1 is a diagram used to explain the effects of changes in aircraft speed, and in distance from a navigation station, upon the navigation requirements of the aircraft;

FIG. 2 is a basic block diagram of a navigation signal correcting and compensating system constructed in accordance with the present invention;

FIG. 3 is a block diagram, partly in circuit schematic form, of a navigation signal correcting and compensating system constructed in accordance with one particular embodiment of the present invention;

FIG. 4 is a block diagram of a further compensating and correcting device constructed in accordance with the principles of the invention;

FIG. 5 is a circuit diagram, partly in block form, of a servo system for an aircraft navigation apparatus constructed in accordance with another embodiment of the invention;

FIG. 6 is a combination block diagram and circuit diagram of another form of compensating and correcting device that may be utilized in the invention;

FIG. 7 is a combination block and circuit diagram of yet another embodiment of the correcting and compensating apparatus of the invention;

FIG. 8 is a circuit diagram of a specific form of limiter circuit that may be utilized in different embodiments of the invention;

FIG. 8A is an explanatory diagram employed to illustrated circuit relations in the circuit of FIG. 9;

FIG. 9 illustrates, in block diagram form, a specific servo system that may be utilized in an aircraft navigation system constructed in accordance with the invention;

FIG. 10 is a combination block diagram and schematic circuit diagram of a complete rectilinear coordinate aircraft navigation system constructed in accordance with the present invention;

Figure 11:
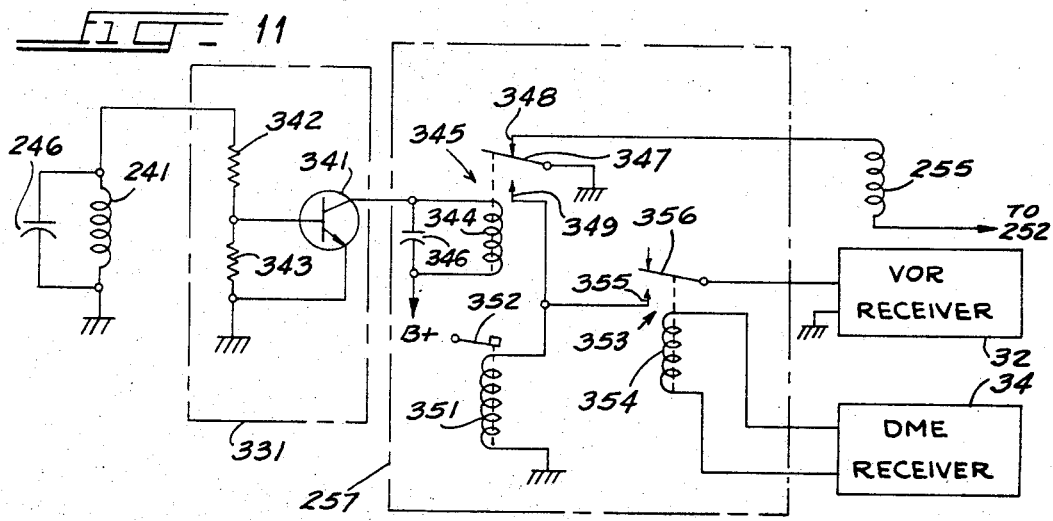
FIG. 11 is a circuit diagram illustrating a warning circuit incorporated in the navigation system of FIG. 10.

Before proceeding with a detailed description of individual embodiment of the present invention, some of the inherent problems resolved by the system may be reviewed in connection with FIG. 1. In FIG. 1, there is shown a conventional VORTAC station 15 that radiates a bearing signal (referred to hereinafter as a VOR signal) and that radiates a distance signal (referred to herein as a DME signal). Three concentric circular paths 16, 17 and 18 encompass VORTAC station 15. Circle 16 is at a distance of six miles from the VORTAC station. Circle 17 is at a distance of approximately fifty-seven miles from the station. Circle 18 is at a radius of approximately one hundred fifteen miles from the station.

If it is assumed that a first aircraft 19 is circumnavigating VORTAC station 15 along path 18, at a distance of approximately one hundred fifteen miles from the station and at a ground speed of six hundred miles per hour, it can be shown that the aircraft moves around the station with an angular velocity of approximately six degrees per minute. If this is the maximum speed for the aircraft, the rate of response of the bearing-indicating instruments in the navigation system of aircraft 19 need not be substantially greater than six degrees per minute, because the aircraft itself cannot change its position, while following path 18, at any greater rate.

The angular velocity of aircraft 19, six degrees per minute, is the same as that of the minute hand on a watch. Angular motion at this low rate is not visually discernible on instruments of any practical size. Nevertheless, the motion is real and is representative of the actual navigational needs of the aircraft 19 as it pursues path 18 at the stated speed. To put the same relationship in context in terms of more conventional information theory, the information rate requirement for aircraft 19, using the usual thirty cycle per second VOR signal from station 15, is approximately two bits per second. This is an exceptionally low information rate and, if fully exploited, the possibilities in terms of band width, power levels, and receiver sensitivity are quite important.

On the other hand, a second aircraft 21 circumnavigating station 15 along path 17 at the same velocity of six hundred miles per hour moves around station 15 with an angular velocity of approximately twelve degrees per minute. Thus, to meet the navigational needs of the aircraft 21 it is necessary for the VOR bearing-indicating apparatus in the aircraft to afford a response rate that is twice the requirement for the aircraft 19. That is, the information rate requirement for the aircraft 21 is now approximately four bits per second. Moreover, the same linear relation obtains with respect to an aircraft pursuing the tight six mile circuit 16. The indicator mechanism controlled by the VOR signal must perform at a rate of approximately one hundred twenty degrees per minute to keep up with the navigational needs of the aircraft 22 and must handle information at a rate of roughly forty bits per second.

On the other hand, in determination of the actual position of the individual aircraft, with respect to the terrain over which they fly, angular deviation is much less significant for the aircraft 22 than for the aircraft 21 and is less significant for the aircraft 21 than for the aircraft 19. Thus, a three degree deviation for the aircraft 19 (angle a, FIG. 1) subtends a chord 23 of approximately six miles along the one hundred fifteen mile circle 18. The same angle makes a difference of only three miles (chord 24) for the aircraft 21 pursuing the circle 17 and only three-tenths of a mile or about fifteen hundred feet for the close-in aircraft 22. Stated differently, as the distance from the aircraft to station 15 decreases, the weight or effect of bearing deviations on position accuracy becomes less and less important. For an aircraft flying directly over VORTAC station 15, the bearing of the aircraft with respect to the station may be disregarded.

From the foregoing considerations, it can be seen that the bearing-determining apparatus for an aircraft such as aircraft 19, flying approximately one hundred fifteen miles from the station, can be slowed up enough to eliminate virtually all short-duration perturbations in the VOR signal received from station 15 without losing any useful information. That is an erratic bearing signal from station 15 can be smoothed to the point of virtually imperceptible motion on the part of the indicating instrument in the aircraft while still following the fastest possible angular motion of the aircraft. In this manner, the actual bearing, free of periodic or aperiodic disturbances, may be accurately determined.

For the aircraft 21 following path 17, however, the bearing indicator response speed postulated above for aircraft 19 is not satisfactory and does not keep up with the movement of the assumed six hundred mile per hour aircraft. However, if the bearing information response rate is increased to twelve degrees per minute for the aircraft 21, the full navigational needs of the aircraft will be met and the angular position of the aircraft can be accurately determined. It is thus seen that a direct correlation can be established between the navigational needs of the aircraft and its distance from VORTAC station 15 and that the required variation in response rate is a direct linear relationship.

Smoothing or filtering of bearing signal information is preferably diminished with increasing distance from station 15, as noted above. However, because the effective weight of the bearing information also diminishes, in regard to an accurate determination of the aircraft position, with decreasing distance from the VORTAC station, the net result of the filtering or smoothing of the bearing signal is relatively constant as regards position determinations. It is thus seen that the VORTAC system, when effectively adapted to the navigational needs of the aircraft, particularly when navigating in terms of rectilinear coordinates, presents one of those rare instances where variable factors add up in a favorable manner. In the same sense, the relationship of aircraft speed to filtering or smoothing requirements for bearing signal information is also favorable. Thus, as the aircraft speed is reduced, susceptibility to low frequency components of roughness in the VOR signal is proportionally increased. However, because of the reduced navigational requirements of a slower aircraft, the time constant of any filtering system applied to the VOR signal can be increased to maintain precisely the same degree of accuracy and usability in the VOR portion of the navigation system.

The initial embodiment of the invention illustrated in FIG. 2 comprises a course deviation indication system 30 including a conventional course deviation indicator (CDI) 31 actuated by a conventional VOR receiver 32. The CDI indicator 31 may comprise a microammeter indicating instrument of the O'Arsonval type. If an instrument of this kind is employed, the direct current output from the VOR receiver 32 is utilized to actuate the indicating instrument.

In the course deviation indication system 30, however, the VOR receiver 32 is not directly connected to the CDI indicator 31. Instead, a variable response rate limiter 33 is interposed in the instrument input circuit. Device 33 may constitute any circuit capable of varying the maximum rate of change of the input signal to the CDI instrument in response to a second applied signal of either mechanical or electrical form. For example, the variable rate limiter could comprise a resistance-capacitance integrating circuit incorporating means for varying the effective impedances of the circuit to materially alter the time constant thereof. Other specific forms of variable rate limiter 33 are described and illustrated hereinafter.

In the system 30 illustrated in FIG. 2, the variable response rate limiter 33 is controlled from a DME receiver 34. The nature of the coupling between DME receiver 34 and limiter 33 is dependent upon the input required by the limiter device to change the effective maximum response rate of the CDI instrument 31. For example, if a DC input is required to the limiter device to modify its maximum response rate, an appropriate DC output signal may be obtained from the DME receiver and utilized for this purpose. On the other hand, if a mechanical variation in the limiter device is necessary to effect the desired change in rate of response in accordance with the distance information obtained from the DME receiver, then a synchro linkage or other mechanical linkage may be utilized to connect the DME receiver to the limiter.

If the normal operating speed of the aircraft were known in advance, the DME receiver 34 could be coupled directly to the limiter device 33. Preferably, however, the coupling is completed through an aircraft speed control device 35 that is adjusted to the actual operating speed of the aircraft. In those instances where an electrical coupling is employed between the DME receiver 34 and the variable response rate limiter 33, the speed control circuit 35 may constitute a relatively simple variable impedance for increasing or decreasing the output signal from the DME receiver in proportion to the operating speed of the aircraft. Where a servo linkage is utilized, the speed control 35 may comprise a conventional servo differential for adjusting the mechanical input to the limiter device 33 in accordance with aircraft speed as well as distance from the navigation station. Moreover, the speed control can be connected separately to the variable response rate limiter 33, instead of being connected in the DME receiver output.

In those instances where a synchro linkage is to be utilized between the VOR receiver 32 and the course deviation indicator 31, instead of the electrical connections illustrated in FIG. 2, the variable rate limiter 33 may be connected to the omnibearing indicator (OBI) that is customarily used with the VOR receiver 32. The OBI instruments commercially available frequently include a synchro differential that is actuated by the VOR receiver and that may be utilized to control an ordinary course deviation indicator or a radio magnetic indicator (RMI). The synchro differential in the OBI instrument affords a convenient means for coupling the DME receiver to the instrument to vary the response rate of the indicator 31 in accordance with the distance of the aircraft from the transmitting navigation station. In this instance, the limiter 33 constitutes an appropriate apparatus for varying the slewing rate of the servo drive; several specific examples are given hereinafter.

System 30, as illustrated in FIG. 2, relates to conventional polar coordinate navigation. The indicator means of system 30, CDI instrument 31, indicates deviation of the aircraft from a radial course centered upon the VORTAC station. This information is given an angular deviation and hence is much less exact, with respect to the precise aircraft position, when the aircraft is a substantial distance from the station than when the aircraft is close to the station. Nevertheless, the operation of the variable rate limiter or distance modifying means 33, controlled by the DME receiver 34, effectively and automatically conditions the system 30 for operation in accordance with the actual navigational needs of the aircraft. That is, limiter 33 effectively smooths out or filters the bearing information as it is applied to indicator 31, eliminating short-duration perturbations in the received signal substantially independently of amplitude of those perturbations. Moreover, the maximum response rater of the indicator is limited to a given maximum, determined by the aircraft speed, by the additional control or limiter means 35. The result is greatly enhanced accuracy and usability with respect to the readings given by the CDI instrument 31, the improvement being sufficient to permit use of VORTAC stations on radials heretofore condemned as unusable for navigation purposes.

FIG. 3 illustrates a linear deviation indication system 40 in which the features of system 30 of FIG. 2 are applied to a different form of navigation system. As before, system 40 utilizes the VOR receiver 32. In this instance, it is assumed that the direct current signal output available with most VOR receivers is employed in the system, this output being coupled to a potentiometer 41. The movable tap 42 of potentiometer 41 is shown mechanically connected to the DME receiver 34. Actually, potentiometer 41 may comprise an integral part of the DME receiver, since it is customary practice to include one or two potentiometers in receivers of this kind with the positions of the potentiometers being governed by the distance-from-station signals received and detected in the DME receiver.

A potentiometer 41 is connected to a variable response rate limiter circuit 33. Preferably, limiter 33 is of the constant current variety described in detail hereinafter in connection with FIG. 9, although other forms of adjustable response rate circuit such as that described in detail in connection with FIG. 10 may be employed. Again, provision is made for an adjustment of the response rate of limiter 33 in accordance with the normal operating speed of the aircraft. In this instance, the adjustment is generally illustrated by a variable resistor 35A.

The output from the variable response rate limiter 33 is supplied to a biasing circuit 43 comprising two batteries 44 and 45 connected to a potentiometer 46. The movable tap 47 of potentiometer 46 is connected to a manual adjusting device 48 illustrated in FIG. 3 as a simple control knob. The electrical connection from the potentiometer tap 47 is completed to an indicating instrument 49. In this instance the indicating instrument has been designated as a linear deviation indicator (LDI) because the information that it displays is in terms of lineal displacement from a given course or track and not in terms of angular deviation as in the system of FIG. 2.

In operation of the linear displacement indication system 40 of FIG. 3, the output signal from VOR receiver 32 as applied to potentiometer 41 develops, on the potentiometer tap 42, a signal that is representative of the bearing of the aircraft relative to the VORTAC station from which navigation signals are received. That is, the amplitude and polarity of the voltage across potentiometer 41 is representative of this bearing. But the amplitude of the signal on tap 42 is also varied in accordance with the distance of the aircraft from the VORTAC station. In effect, the output signals from the VOR and DME receivers are multiplied together by potentiometer 41 to produce a compound signal, on tap 42, having an amplitude and polarity indicative of the lineal displacement of the aircraft from a given course intersecting the position of the VORTAC station.

Because the amplitude of the signal supplied to the indicating instrument 49 is a direct function of distance from the VORTAC station, it is no longer essential to vary the response rate of limiter circuit 33 in accordance with the distance from the station. For linear displacement signals of this kind, a fixed maximum response rate is automatically and inherently proportioned, in its effect, to the distance from the navigation station. However, it is still necessary to adjust the response rate of circuit 33 to correspond to the normal operating speed of the aircraft and this is accomplished by means of the speed adjustment 35A. As in the previous embodiment, the basic function of the response rate control 33 is to prevent movements of the indicating instrument at rates in excess of the actual navigational needs of the aircraft, thereby enhancing the usability of the received bearing information from VOR receiver 32 and avoiding the confusion that could otherwise be produced by high-amplitude short-duration perturbations in the received navigation signal.

If the output of limiter 33 were applied directly to the LDI instrument 49, the instrument would give a direct reading of linear displacement from a radial path intersecting the VORTAC station from which the navigation signals are received. In many instances, however, it is desirable to fly a path parallel to such a radial, thus following a track that passes by but does not intersect the VORTAC station. Such tracks are illustrated at A and B, FIG. 1, parallel to the magnetic north radial C. This type of operation is made possible by biasing circuit 43.

Thus, if tap 47 on potentiometer 46 is exactly centered, the LDI instrument 49 reads in terms of displacement from the radial course over the VORTAC station. To establish a parallel track that will not pass over the VORTAC station, the adjustment means represented by knob 48 is actuated to displace tap 47 along potentiometer 46 and thereby apply a fixed bias to the LDI instrument. By proper calibration of potentiometer 46 and control device 48, the pilot is enabled to fly a track displaced one mile, two miles, five miles, or more from the radial course. This arrangement enhances the utility of the VORTAC station, enabling a number of different aircraft to fly parallel tracks guided by the navigation signals from the station without incurring the possibility of collision that is always present when flying radials that intersect at the station. It should be noted that this multi-track arrangement retains the full advantages of the smoothing and filtering action of the limiter device 33 with respect to the received VOR signal.

FIG. 4 illustrates an aircraft navigation system 50 that is substantially more complete and somewhat more complex than the systems described hereinabove. In system 50, the output signals from the VOR receiver 32, representative of the bearing angle $\theta$ of the aircraft relative to magnetic north at VORTAC station 15 (see FIG. 1) are supplied to a computer 51. The output signals from the DME receiver 34, representative of the radius R (FIG. 1) of the aircraft from the VORTAC station are also supplied to computer 51 (FIG. 4). Computer 51 produces two output signals, $R \cos \theta$ and $R \sin \theta$, which are representative of the position of the aircraft expressed in Cartesian coordinates relative to the position of the VORTAC station. That is, the polar coordinate data initially received from the VORTAC station and representative of the distance R and the angle $\theta$ is resolved, in computer 51, into the rectilinear coordinates X and Y as shown in FIG. 1. There are a variety of different computer devices capable of performing this operation; a preferred form of computer, in a more complex system, is described hereinafter in connection with FIG. 10.

As in the previously described systems, the navigation information signals are supplied through a response rate limiter 33 to an indicating instrument 52. The instrument 52 displays the full navigation information with respect to direction of travel and distance to the VORTAC station, assuming that it is desired to fly a radial course to the station, in a single unified display. Thus, the Y signal ($R \cos \theta$) controls vertical movement of a horizontally extending indicator line 53 across the field of the indicator instrument 52. The X signal ($R \sin \theta$) controls horizontal displacement of a vertically extending indicator line 54 across the face of the instrument.

The rectilinear situation indicator (RSI) 52 further includes a fixed indicator element 55, representative of the position of the navigation station, which is located at the center of the instrument. The intersection 56 of indicators 53 and 54 shows the position of the aircraft relative to the station 55. A bearing setting device 57 is provided, with a connection to an appropriate display mechanism to display the desired bearing in the window 58 of instrument 52. A further connection may be made from the device 57 to computer 51 to orient the computer in relation to that setting.

With respect to the present invention, system 50 of FIG. 4 functions much like system 40 of FIG. 3, except that overall system operation is now in terms of rectilinear coordinate data instead of the simpler linear deviation indication afforded by system 40. As in the previous embodiments, the limiter 33 controls the rate of movement of the indicator elements 53 and 54 of the navigation instrument 52, preventing excessively rapid movements of the indicator elements that would not be properly related to the speed of the aircraft and its distance from the navigation station. Because both of the rectilinear coordinate signals include and are modified by the distance information from the DME receiver 34, effective smoothing of relatively short-duration high-amplitude perturbations in the navigation signals can be effected by limiter 33 without direct control of the maximum response rate proportional to distance from the VORTAC station. On the other hand, it is desirable and in fact necessary that the operation of the limiter circuit 33 be coordinated with the normal operating speed of the aircraft and this is accomplished by means of the speed adjustment 35A.

FIG. 5 is a circuit diagram, partially in block form, of a null-seeking servo system constituting a specific example of the system described generally hereinabove in connection with FIG. 2. System 60 comprises a synchro differential mechanism 61 having a three-winding stator including windings 62, 63 and 64 and a rotor comprising the three windings 65, 66 and 67. Differential 61 may be an integral part of the conventional omnibearing indicator (OBI) instrument that is frequently used in conjunction with a VOR receiver. The OBI instrument quite often includes a synchro differential for the purpose of permitting auxiliary control functions from the OBI. The rotor 65–67 is mechanically coupled to VOR receiver 32 so that the rotor position is controlled by the bearing signals received and detected in receiver 32.

The system 60 illustrated in FIG. 5 further includes a synchro transmitter 68 having an input winding 69 inductively coupled to three output windings 71, 72 and 73. The input winding 69 is on the rotor of the synchro transmitter, but this rotor is restrained against movement since the control function for the synchro system is relegated to the mechanical connection from VOR receiver 32 to differential 61. Winding 69 is connected to the AC supply of the aircraft. Windings 71, 72 and 73 are connected, at one terminal, to each other. Winding 71 is connected to the input winding 62 of the differential 61. Similarly, winding 73 in the transmitter is connected to the differential input winding 63 and winding 72 is connected to the differential input winding 64.

The output rotor windings 65, 66 and 67 of synchro differential 61 are each electrically connected to the others at one terminal. In addition, windings 65, 66 and 67 are individually electrically connected to the three stator windings 75, 76 and 77, respectively, of a synchro control transformer 74. The rotor output winding 78 of control transformer 74 is connected through an amplifier 79 to the control winding 81 of a servomotor 82. The servomotor 82 further includes a second quadrature stator winding 83 that is connected to the AC supply of the aircraft.

The rotor 84 of servomotor 82 is connected, through its shaft, to a variable ratio drive unit 85. Drive unit 85 may comprise, by way of example, a conventional ball-disc integrator in which the drive ratio is varied by radial displacement of a ball that affords a driving connection between a pair of parallel discs. The connection to servomotor 82 provides the input for the drive unit and the output shaft or other output means of the drive unit is mechanically connected back to the rotor 78 of control transformer 74. In addition, the output shaft of drive unit 85 is connected to the course deviation indicator 31, the reading on the CDI indicator thus being controlled by the angular position of rotor 78.

In system 60, the DME receiver 34 is connected to the control winding 87 of a second servomotor 88. Servomotor 88 is provided with a second stator winding 89 that is connected to the AC supply of the aircraft. The rotor 91 of servomotor 88 is mechanically connected to variable ratio drive unit 85 and more specifically to the control portion of the variable ratio drive, to modify the speed at which the CDI instrument and control transformer 74 are driven.

In operation of system 60, a change in the aircraft bearing, as detected in VOR receiver 32, results in a corresponding angular displacement of the rotor 65–67 of synchro differential 61, effected by the mechanical linkage from the VOR receiver to the OBI differential. The rotary movement of the differential secondary produces a change in the relative amplitudes of the signals induced in its windings 65, 66 and 67 and a corresponding change in the amplitude relations of the signals in the input stator windings 75, 76 and 77 of control transformer 74. As a consequence, an error signal is developed in rotor winding 78. This error signal is amplified in amplifier 79 and is supplied to control winding 81 of servomotor 82.

In the presence of an error signal, rotor 84 of servomotor 82 begins to turn. Rotational movement of rotor 84 drives the control transformer rotor 78, through the linkage afforded by drive unit 85, turning the control transformer rotor until no error signal is produced. It is thus seen that control transformer 74, amplifier 75, servomotor 82, and drive unit 85 are connected together in a null-seeking servo loop. As noted above, course deviation indicator 31 is connected to drive unit 85 to indicate the course deviations producing the error signals that effect operation of the servo loop.

If servomotor 82 were connected directly back to the control transformer rotor 78 and were also connected directly to the CDI indicator 31, the transients, "scallops," space modulation and other perturbations commonly present in the bearing signals derived and detected in VOR receiver 32 would be directly reflected in movements of the CDI pointer. A substantial improvement could be effected simply by interposing an appropriate gear train or other speed-reducing drive linkage between the servomotor, on the one hand, and the control transformer and CDI instrument on the other hand. But the fixed rate limitation introduced by such a drive linkage might well be excessive when the aircraft is passing close to the VORTAC station, yet inadequate when the aircraft is flying at a long distance from the station.

Navigation system 60 affords a direct and effective means for regulating the response speed of the course deviation instrument 31 in accordance with distance of the aircraft from the station, through the control afforded by DME receiver 34 and servo motor 88, which varies the drive ratio of unit 85 in accordance with distance of the aircraft from the VORTAC station. Thus, system 60 effectively and inherently provides for continuous modification of the response rate of the course deviation indicator 31 in accordance with the actual navigational needs of the aircraft. In this regard, it should be noted that drive unit 85 may be selected to fit the normal speed range of the aircraft or may be provided with an auxiliary adjustment to correlate the response rate of the servo system with other aircraft speed categories.

FIG. 6 illustrates a different form of null-seeking servo system 100 for adapting a course deviation indication apparatus to the navigational needs of an aircraft. System 100 is generally similar to system 60 of FIG. 5; as shown in FIG. 6, it comprises a synchro linkage from the VOR receiver 32 through the synchro differential 61 of a conventional OBI instrument to the stator 75–77 of a control transformer 74. As before, the rotor 78 of the control transformer is coupled through an amplifier 79 to the stator control winding 81 of a servomotor 82. In this instance, however, the rotor 84 of servo motor 82 is provided with a direct drive connection to the rotor winding 78 of the control transformer 74 and to the course deviation instrument 31.

In system 100, it is the quadrature stator winding 83 of servomotor 82 that is utilized to control the rotational speed of the motor and thereby control the response rate of the CDI meter 31 and the control transformer rotor 78. Winding 83 is energized from a pulser circuit 101 that is provided with two inputs. One input to pulser circuit 101 is taken from the AC supply of the aircraft. The other input is derived from the DME receiver 34.

Pulser circuit 101 is a relatively simple gate circuit that is opened up periodically in response to charging of a timing capacitor and that remains open just long enough to pass a single cycle of the AC supply voltage to winding 83. The charging time of the timing capacitor (not shown) is determined by the output signals from DME receiver 34. It is thus seen that the output signal from pulser circuit 101 is of the general form indicated by reference numeral 102, with the time intervals between the individual one-cycle pulses varying in accordance with the distance of the aircraft from the VORTAC station, as established by the output signals from DME receiver 34.

In system 100, a change in the aircraft bearing is indicated by rotation of the secondary or rotor of the OBI differential 61, producing a change in the relative amplitudes of the signals in stator windings 75–77 of control transformer 74. This change produces an output signal or error signal in winding 78 which is amplified and applied to the control winding 81 of servomotor 82. As long as the error signal persists, the servomotor rotor 84 is driven, turning the rotor winding 78 of the control transformer and deflecting the pointer of CDI instrument 31 to show the bearing change. But angular movement of rotor 84 can occur only upon coincidence of an error signal in control winding 81 and a signal upon the quadrature winding 83. Thus, the rate of angular movement of rotor 84 is controlled by the recurrence frequency of the pulses in signal 102, which in turn is determined by the output signal from DME receiver 34, indicating the displacement of the aircraft from the VORTAC station. The rate of response of the course deviation system 100 is thus regulated in accordance with the distance of the aircraft from the navigation station. To adjust system 100 to the speed requirements of the aircraft, an appropriate adjustment element such as the variable resistor 101A may be provided in connection with pulser circuit 101.

FIG. 7 illustrates another embodiment 110 of the bearing signal correcting and compensating apparatus of the present invention. As in the systems illustrated in FIGS. 5 and 6, the VOR receiver 32 is mechanically coupled to the OBI synchro differential 61. As before, the secondary rotor windings of the OBI differential are electrically connected to the stator windings of the control transformer 74. The output of the control transformer is connected to an amplifier 79 which is in turn coupled to one of the quadrature stator windings of a servomotor 82. The rotor of servomotor 82 is connected to the course deviation indicator 31 and to the rotor of control transformer 74.

System 110 of FIG. 7 further includes a potentiometer 111 having a movable tap 112. Potentiometer 111 is connected across the secondary winding of a transformer 113 in a circuit which may include, in series, a trimmer resistor 114. The primary winding of transformer 113 is connected to the AC supply of the aircraft. The movable tap 112 of potentiometer 111 is mechanically connected to the DME receiver 34. Potentiometer 111 may constitute an integral part of the DME receiver.

The movable tap 112 of potentiometer 111 is connected to the input winding of an AC tachometer generator 115. Tachometer generators of this kind, as known in the art, bear a general resemblance to a two-phase induction motor with two stator windings arranged in space quadrature and a rotor which is not conductively connected to any external circuit. The two stator windings, in effect, function as the primary and secondary voltage windings of a transformer, but with no voltage induced in the secondary or output winding except upon rotation of the rotor of the generator.

The rotor of tachometer generator 115 is driven from the rotor of servomotor 82. The secondary or output winding of the tachometer generator is coupled to an amplifier 116 which is in turn connected to one of the two input windings of motor 82.

In considering operation of the correcting and compensating system 110 of FIG. 7, it should first be noted that the interconnection between DME receiver 34 and potentiometer tap 112 is such that an input signal of maximum amplitude is supplied to tachometer generator 115 when the DME receiver detects that the aircraft is located immediately over the VORTAC station. Conversely, a minimum-amplitude signal is supplied to the tachometer generator when the aircraft is at a given maximum distance from the navigation station. Stated differently, as viewed in FIG. 7, the tap 112 is pulled downwardly in response to movement of the aircraft away from the VORTAC station so that the amplitude of the input signal to tachometer generator 115 is inversely proportional to the distance of the aircraft from the station.

The rotational speed of servomotor 82 is a function of the amplitudes of the two signals supplied thereto from amplifiers 79 and 116. The amplitude of the error signal supplied to amplifier 79 is determined by the output of VOR receiver 32. But the amplitude of the second signal supplied to the servomotor from amplifier 116 is an inverse function of the distance of the aircraft from the navigation station, as described above. Consequently, maximum response rate is achieved by the servomotor 82 (and hence by the course deviation instrument 31) when the aircraft is closest to the VORTAC station. By the same token, slower response is achieved as the aircraft moves away from the station. The apparatus 110 thus effectively adjusts the response rate of the navigation system to fit the actual navigational needs of the aircraft in relation to its displacement from the source of controlling navigation signals. As in the previously described systems, it is usually desirable to afford some means for adjusting the response rate of the system to fit the speed range of the aircraft and this can be accomplished by means of the trimmer resistor 114 or other appropriate means.

FIG. 8 is a circuit diagram of a preferred form of rate-limiting control circuit 33A that may be utilized in electrically operated navigation systems constructed in accordance with the invention, such as those of FIGS. 3 and 4, as contrasted with the servo systems of FIGS. 5 through 7. Circuit 33A, as illustrated in FIG. 8, comprises a first transistor 121 having its collector electrode connected to one of the input terminals 122 of the circuit. The base electrode of transistor 121 is connected to a constant-voltage DC supply E1. The emitter electrode of the transistor is connected through two series-connected variable sensing resistors 124 and 125 to the emitter electrode of a second transistor 126.

The base electrode of transistor 126 is connected to a second constant-potential DC supply E2. The two voltage supplies E1 and E2 are connected to each other and are returned to the common terminal 127 of the two resistors 124 and 125. The collector electrode of transistor 126 is connected to one of the output terminals 128 for the circuit. A capacitor 131 is connected across the output terminals 128 and 129 and the second output terminal 129 is connected back to the second input terminal 123 for the device.

It will be recognized that each of the transistors 121 and 126 is forward biased for signals of a given polarity and that the polarities are reversed with respect to the two transistors. The transistor 121 represents an effective short circuit for signals of one particular polarity and the transistor 126 is a short circuit for signals of opposite polarity.

Considering transistor 126, initially, it is seen that the DC voltage E2 affords a forward bias to the transistor. Assuming that the output impedance across terminals 128 and 129 is relatively small in comparison with the sensing resistor 125, an increase in the load current I of the device increases the voltage drop across the sensing resistor 125. When the voltage drop across resistor 125 is equal to the bias voltage supplied by source E2, the net bias applied to the emitter and base electrodes of the transistor is zero. This reduction to zero forward bias causes the transistor 126 to change its mode of operation to the so-called active region. Under these circumstances, the effective emitter-collector resistance becomes very high, preventing any further significant increase in the discharge currents available to charge the output capacitor 131. Consequently, any further increase in the amplitude of the signal voltage applied to the input terminals 122 and 123 does not materially increase the load current. Instead, the load current I remains substantially constant over a wide range of input voltages and, in fact, cannot exceed a fixed maximum value equal to the resistance of the sensing impedance 125 divided by the voltage of the source E2. The circuit for the transistor 121 functions in exactly the same way for signals of opposite polarity.

The effect of this limitation upon the output current I of circuit 33A, the charging or discharging current for capacitor 131, for substantial signal fluctuations, is illustrated in FIG. 8A. In that figure, the solid line 133 is a graphic representation of an input signal supplied to terminals 122 and 123, exhibiting two sharp positive-going peaks 134 and 135, a short, sharp negative-going peak 136, and a relatively broad negative-going excursion 137. The current-limiting characteristics of circuit 33A reduce the initial high-amplitude short-duration pulse 134 to the relatively small positive-going excursion 134A. For the long-duration excursion 137 of the input signal, there is an averaging effect as indicated by the dash line 137A. The alternating peaks 135 and 136 are smoothed out to the single low-amplitude peak 135A. Inasmuch as sharply peaked signals (134–136) almost invariably are associated with errors in the received VOR bearing signals, the smoothing or averaging operation afforded by circuit 33A substantially enhances the accuracy and usability of the received signal, as applied to a navigation system such as any of the devices illustrated in FIGS. 2, 3 and 4. Yet there is no significant loss of the information represented by the extended-duration signal excursion 137.

To adjust the limiting maximum current for circuit 33A, the variable resistors 124 and 125 can be ganged together, as shown, and adjusted from an external source such as the DME receiver 34. On the other hand, the limiting maximum current, which effectively determines the maximum rate of response of the instrument load connected to terminals 128 and 129 by determining the charging rate of the capacitor 131, can be modified by conjointly varying the potentials E1 and E2 in response to the received distance signals from the DME receiver. Adjustment of the circuit to fit the speed requirements of a given aircraft can be accomplished by inserting additional adjustable resistors in series with the sensing resistors 124 and 125 or by appropriate adjustment of the voltage supplies E1 and E2.

FIG. 9 illustrates another servo system 140 that may be utilized in an aircraft navigation system constructed in accordance with the invention. As in the previously described servo systems, the VOR receiver is coupled through a synchro differential, which may be the differential available in the OBI instrument, to control transformer 74. The error signal output from the control transformer is amplified in an amplifier 79 and applied to the control winding of the servomotor 82. As in the embodiment of FIG. 7, the servomotor 82 is directly linked to the rotor of the control transformer 74, and also provides a direct drive to the course deviation indicator 31. In system 140, the quadrature winding of servomotor 82 is energized directly from the AC supply of the aircraft. The same supply is also utilized to energize the input winding of a tachometer generator 141 which may be similar in construction to the generator 115 discussed above in connection with FIG. 7. The rotor of the tachometer generator is driven directly from the shaft of servomotor 82.

In this instance, however, the output winding of the tachometer generator 141 is connected back through a negative feedback loop to the input of amplifier 79. The negative feedback circuit includes two adjustable impedances as represented by the variable resistors 142 and 143. Resistor 143 may be connected to the DME receiver 34 and may, in fact, constitute one of the potentiometers already available in most such receivers. The variable resistor 142 is adjusted to suit the speed of the particular aircraft in which the system is installed.

The operation of system 140, FIG. 9, with respect to the VOR receiver 42, differential 61, control transformer 74, amplifier 79, servomotor 82, and indicator 31, is essentially the same as described above in connection with FIG. 7. In this instance, however, the control of the rate of movement of servomotor 82, and hence of indicator 31, is effected by the negative feedback circuit comprising the tachometer generator 141 and the impedances 142 and 143. Whenever a change occurs in the bearing signal from VOR receiver 32, applied mechanically to differential 61, control transformer 74 produces an error signal that is supplied to motor 82 through amplifier 79. The motor starts to turn, at an angular velocity determined by the amplitude of the error signal.

But the initial turning of the motor produces an output signal from the tachometer generator 141, the amplitude of this output signal being related to the angular velocity of motor 82. This signal from the tachometer generator is applied, as a negative feedback signal, back to the amplifier 79 and slows down the motor. In this manner, the response rate of the servomotor 82, and hence of the course deviation indicator 31, is materially reduced.

The effect of the negative feedback circuit can be varied in accordance with distance of the aircraft from the navigation station by means of the coupling from the DME receiver 34 to the variable resistance 143. By the same token, the response rate of the system may be adjusted, by means of the variable impedance 142, to match the normal operating speed range of the aircraft, increasing the impedance for high speed aircraft and reducing the impedance for low speed aircraft. Thus, as with the previously described systems, system 140 effectively and inherently operates to adjust the response rate for the course deviation indicator 41 to suit the true navigational needs of the aircraft. At the same time, the system effectively eliminates signal roughness, including scallops, space modulation, and other signal perturbations, in the output of the VOR receiver 32, due to the smoothing effect of the negative feedback arrangement.

In the servo systems of FIGS. 5, 6, 7 and 9, the response rate of the course deviation indicator is adjusted on a continuous basis by a linkage from the DME receiver to the servo apparatus that actuates the CDI instrument. The same arrangement is illustrated in FIG. 2, which portrays the basic system in terms of electrical connections but which can equally well be interpreted in terms of servo systems. It should be noted, however, that this direct control is not necessary where the bearing and distance information signals are compounded to produce a linear displacement indication as in the systems illustrated in FIGS. 3 and 4.

With reference to the servo arrangement of FIG. 9, as a typical example, if the control of synchro differential 61 is effected by the combined signals from the VOR receiver and the DME receiver, as by using R-θ computer or a simple arithmetic compounding arrangement (FIGS. 4 and 3 respectively), then it is unnecessary to control the feedback loop from the DME receiver 34. The reason for this is that, in those navigation systems in which displacement from the desired track is indicated by signals proportional both to the distance and bearing angle relative to the station, a fixed maximum response rate control for the indicating system varies automatically, in overall effect, in relation to displacement of the aircraft from the navigation station. Stated differently, in those systems in which the distance and bearing data are compounded or encoded prior to display, the rate of response of the display instrument can be controlled by a constant-rate limiting device and such a control will inherently and effectively provide for a response that is related to the true navigational needs of the aircraft, once it is properly adjusted for the aircraft operating speed.

FIG. 10 illustrates a complete aircraft navigation system 200 combining many of the features of the systems described above in a computer-operated apparatus for navigation by rectilinear coordinates. In navigation system 200 the variable tap 214 of a DME receiver potentiometer 213 is coupled through a transformer 231 to the stator winding 232 of a rotary AC resolver, identified in the drawing as a received data resolver 233. Resolver 233 is of conventional construction and includes the usual pair of quadrature rotor windings 234 and 235. A second stator winding may be included, in accordance with usual practice, but is not used in the received data resolver 233 and hence has not been illustrated.

As in some of the devices described above, the VOR receiver 32 that is incorporated in navigation system 200 drives a synchro differential 61 that is a part of the omnibearing indicator of the receiver. The differential 61 is electrically connected to the three stator windings 236, 237 and 238 of a conventional control transformer 239. One terminal of the rotor winding 241 of control transformer 239 is connected to system ground. The other terminal of winding 241 is connected through a series resistor 242, a capacitor 243, and a further series resistor 244 to a servo amplifier 245. A capacitor 246 may be connected in parallel with rotor winding 241.

The output of servo amplifier 245 is connected to one terminal of a first field winding 247 of a servomotor 248, the other terminal of winding 247 being connected to system ground. Motor 248 is a conventional two phase servomotor and includes a quadrature stator winding 249 and a rotor 251 that is inductively coupled to both of the windings 247 and 249. The quadrature winding 249 of motor 248 is connected to a suitable AC power supply 252 which may comprise the conventional 26 volt, 400 cycle supply available in most aircraft. The rotor 251 of the servomotor is mechanically connected to the rotor of the received data resolver 233, comprising windings 234 and 235, and is utilized to control the angular position of the resolver rotor relative to the stator winding 232 as described more fully hereinafter.

The rotor 251 of servomotor 248 is also mechanically coupled in driving relation to the rotor 253 of a tachometer generator 254. Generator 254 is a conventional AC rate generator, like generator 115 (FIG. 7), and comprises two stator windings 255 and 256 arranged in space quadrature relation to the rotor 253, to which both windings are inductively coupled. Winding 255 comprises the input winding of the tachometer generator and is electrically connected to the AC supply 252 and to a warning circuit unit 257 described more fully hereinafter. Stator winding 256 is the output winding of the tachometer generator.

One terminal of output winding 256 is connected to system ground. The other terminal is connected through a series capacitor 258 and a series resistor 259 to the common terminal 261 of the resistor 242 and the capacitor 243 in the input circuit to servo amplifier 245. This circuit affords a negative feedback circuit from tachometer generator 54 back to the input of servo amplifier 245, the operation of which is essentially as described above in connection with FIG. 9. Preferably, a parallel RC circuit comprising a capacitor 262 and a resistor 263 is connected in shunt with winding 256 to provide for phase and amplitude adjustment of the generator output.

Navigation system 200 further includes a way point bearing resolver 264 that is essentially a duplicate of the received data resolver 233. Thus, resolver 264 comprises a stator winding 265 and two rotor windings 266 and 267 that are arranged in space quadrature with respect to each other. Again, in the normal commercial form resolver 264 would include a second stator winding but this winding is not used and hence has not been illustrated in the drawings.

The stator winding 265 of the way point bearing resolver 264 is coupled through a transformer 268 to the movable tap 269 of a potentiometer 271. The tap 269 of potentiometer 271 is manually adjustable by suitable means generally illustrated by the distance setting knob 272. The knob 272, or other setting means, is calibrated to adjust potentiometer 271 for varying radial distances from the navigation station to a selected way point. The potentiometers 213 and 271 are connected through a trimming potentiometer 273 to a scale factor control 274. The scale factor control 274 comprises a multi-tap connection to the AC supply 252 to modify the amplitude of the AC voltage supplied to potentiometers 213 and 271 to achieve different scale settings for navigation system 200.

Means are also provided for manually adjusting the angular position of the rotor of resolver 264 relative to its stator. In FIG. 10, this arrangement is shown in simplified form and comprises a bearing setting knob 275 that is mechanically connected to the resolver rotor. With respect to both of the manually adjustable setting knobs 272 and 275, it should be recognized that appropriate servo mechanism or other indirect linkages may be employed instead of the simple manual drives illustrated, if desired.

The rotor windings 234 and 235 of the received data resolver 233 of the rotor windings 266 and 267 of the way point bearing resolver 264 are connected together in the input of a track resolver 277. Thus, one terminal of rotor winding 267 of resolver 264 is connected to system ground and the other terminal is connected to one end of the received data resolver winding 234, the other terminal of winding 234 being connected to a first stator winding 278 in track resolver 277. The stator winding 278 is returned to system ground to complete the circuit. A similar circuit arrangement connects the rotor winding 266 of way point bearing resolver 264 in series with the received data resolver winding 235 to a second quadrature stator winding 279 for the track resolver 277.

The rotor of track resolver 277, like the rotors of the resolvers described above, comprises two quadrature windings 281 and 282. One terminal of winding 281 is connected to system ground. The other terminal of this track resolver rotor winding is connected to an amplifier 283 which in turn is coupled to a detector circuit 284. Similarly, one terminal of resolver winding 282 is connected to system ground and the other terminal is connected through an amplifier 285 to a detector circuit 286. The two detector circuits 284 and 286 provide individual drive signals for a combined linear deviation indicator instrument 52A.

In the rectilinear situation indicator 52A, incorporated in system 200, the vertical movements of the horizontally extending distance indicator line 53A are effected by an appropriate meter movement or "motor" generally represented in FIG. 10 by the resistor 291. A resistor has been shown because devices of this kind ordinarily are substantially resistive in their impedance characteristics. The meter movement 291 is coupled to the detector 286 by means of a limiter circuit 292. The limiter circuit comprises a pair of diodes 293 and 294 connected in opposed polarities in shunt relation to the output terminals of detector 286. Circuit 292 further includes a series resistor 295 and a shunt capacitor 296. It is thus seen that the circuit 292 is, essentially, a resistance-capacitance integrating circuit which also serves to limit the amplitude of the signal that is integrated and supplied to the meter movement 291.

The meter movement or other appropriate "motor" that controls the position of the vertically extending linear displacement indicator line 54A in the rectilinear situation indicator 52A is represented, in FIG. 10, by the resistance 297. The "motor" 297 is electrically connected to the detector circuit 284 by a response rate limiting circuit 298 that is generally similar to circuit 292.

Thus, circuit 298 includes two diodes 299 and 301 that are connected in shunt relation to the output terminals of detector 284 but in reversed polarities relative to each other. Circuit 298 further includes a series resistor 302 and a shunt capacitor 303 affording a resistance-capacitance integrating circuit. In addition, however, circuit 298 includes a second capacitor 304 that is substantially larger than capacitor 303. Capacitor 304 may be connected in parallel relation with capacitor 303, or may be disconnected from the circuit, by operation of a switch 305.

Returning to track resolver 277, it is seen that the rotor of this resolver, comprising windings 281 and 282, is mechanically connected to the rotor 311 of a servomotor 312. Servomotor rotor 311 is also used to drive the rotor 313 of a control transformer 314. The rotor winding 313 of control transformer 314 is connected back to the control winding 315 of servomotor 312 through an amplifier 316 to complete a null-seeking servo circuit. The quadrature input winding 317 of servomotor 312 is connected to the AC supply 252.

The primary of control transformer 314 comprises the windings 321, 322 and 323, each having one terminal common with the others. Windings 321, 322 and 323 are individually connected to the secondary windings 324, 325 and 326, respectively, of a synchro transmitter 328. Windings 324–326 are electrically connected to each other to complete the synchro circuit. The primary winding 327 of synchro transmitter 328 is electrically connected to the AC supply 252. Winding 327 is the rotor winding for the synchro transmitter and is mechanically connected to a course setting means represented by a knob 329. The control knob or other setting means 329 is also mechanically connected to the RSI instrument 52A for setting of the course that appears in the window 58A of the instrument. In normal practice, the setting knob 329 is located immediately adjacent the instrument 52A for the convenience of the pilot.

Considering operation of the complete aircraft navigation system 200, perhaps the best starting point is the VOR receiver 32. The VOR receiver is mechanically coupled to an appropriate synchro differential 61, which may be a part of the OBI instrument of the aircraft, an arrangement like that described above in connection with FIG. 5. As in FIG. 5, the VOR receiver is connected to the secondary of the synchro differential, the primary being connected to an appropriate fixed transmitter (not shown). The output signals from differential 61, representative of received bearing signals as derived by VOR receiver 32, are supplied to the input windings 236–238 of control transformer 239.

Whenever the rotor of control transformer 239 is not exactly aligned with the primary windings of the control transformer, as when a change in bearing has occurred, an error signal is produced in rotor winding 241 and is applied to the control winding 247 of servomotor 248 through the coupling circuit comprising resistor 242, capacitor 243, resistor 244, and amplifier 245. The resulting rotation of the servomotor rotor 251 repositions the rotor 234, 235 of the received data resolver 233. Thus, the angular orientation of the received data resolver rotor is continuously maintained at a position indicative of the bearing of the aircraft as derived from the signals from VOR system 32.

The mechanical coupling from servomotor rotor 251 to tachometer generator rotor 253 causes the tachometer generator to develop an output signal whenever the servomotor rotates. The signal from tach generator 254 is coupled back to motor amplifier 245 in a negative feedback circuit comprising capacitor 258 and resistor 259. The negative feedback circuit functions, in the manner described above in connection with FIG. 9, to limit the response rate of the servomotor and thus effectively damps changes in the angular position of the received data resolver 233. Accordingly, the tachometer generator feedback circuit reduces the effect of high-amplitude short-duration perturbations in the received VOR signals, much like a low-pass filter, enhancing both the usability and the accuracy of the information derived from those signals and represented ultimately by the angular positioning of received data resolver 233. It will be recognized that the mechanical connection from motor rotor 251 back to control transformer rotor 241 affords a null-seeking servo arrangement, like those described above, in which the rotational movement of the servomotor is interrupted as soon as the control transformer rotor is re-positioned in an alignment corresponding to changed signal amplitude conditions in the control transformer primary.

In addition to the bearing information supplied to the received data resolver 233 by means of the angular positioning of the resolver rotor from servomotor 251, it is also necessary to apply distance information to the resolver. This is accomplished by the connection from the DME receiver 34 to the potentiometer 213. Thus, the amplitude of the input signal supplied to the stator winding 232 of resolver 233 is proportional to the distance of the aircraft from the navigation station. This being the case, it can be shown that the output signal on one of the windings 234 and 235 is of the form $R' \sin \theta'$, where $R'$ represents the distance of the aircraft from the navigation system as derived from DME receiver 34 and $\theta'$ represents the bearing angle relative to magnetic north at the station as derived from the VOR receiver 32 (see aircraft 332, FIG. 1). Resolver 233 thus constitutes an $R$–$\theta$ computer as discussed above in connection with FIG. 4.

The way point bearing resolver 264 functions in precisely the same manner as received data resolver 233, but on the basis of the distance of the navigation station from a predetermined distant way point and bearing of the way point relative to magnetic north at the station. The pilot selects a given way point (point 333, FIG. 1) to which he wishes to fly, a point that is within reception distance of the signal from the VORTAC station to which receivers 32 and 34 are tuned. The distance setting means 272 (FIG. 10) is adjusted to the distance $R''$ from the station to the selected way point. As a consequence, a signal having an amplitude proportional to that distance is supplied to the input winding 265 of way point bearing resolver 264. The bearing relative to the selected way point (angle $\theta''$, FIG. 1) is fed into the resolver by adjusting the bearing setting means 275, rotating the resolver secondary 266–267 to an orientation representative of this bearing. Consequently, the amplitudes and phase relations of the signals induced in windings 266–267 are representative of the rectilinear coordinates of the way point with respect to the navigation station. That is, resolver 264 functions as an $R$–$\theta$ computer with respect to the way point location.

The east-west coordinate signals from resolver 233 and 264 could be subtracted from each other, in an appropriate electrical circuit, to develop a signal indicative of the displacement of the aircraft from the direct path to the way point in this coordinate direction. Similarly, the north-south coordinate signals from the two resolvers could be subtracted to develop a deviation signal representative of the difference between the way point bearing data and the actual bearing data in that direction. But this information would still be in arbitrary north-south and east-west coordinates and a display of the information would present substantial difficulties with respect to scale factor of the indicator means 52A.

In the computer system 200, the two sets of coordinate signals developed in the received data resolver winding 234 and the way point resolver 267 are effectively subtracted from each other by means of the series connection of those windings, so that the signal supplied to the input winding 278 of track resolver 277 constitutes a difference signal representing deviation along one coordinate axis. Similarly, the combined signal from winding 235 and 266 that appears across the input winding 279 of the track resolver represents a difference signal related to the other coordinate axis. But further resolution of these signals is required before application to the indicator means 52A.

Thus, it is highly desirable to have display 52 oriented, in terms of the indication given to the pilot, along the track or path to be actually followed by the aircraft. More importantly, it is desirable to orient the display along the track to permit expansion of the scale factor of the indicator means to give closer control of deviations from the track. To accomplish this end, the rotor 281, 282 of track resolver 277 is oriented, by the pilot, to a position representative of the actual bearing along which the aircraft will fly to the way point. The pilot adjusts the adjusting means 329 to orient the rotor 327 of synchro transmitter 328 to a position representative of the desired bearing. The requisite angular information is transmitted to control transformer 314, which drives servomotor 311 until the servomotor re-orients the rotor 313 of the control transformer at a null position. The angular movement of the servomotor rotor 311 effectively re-positions the track resolver rotor 281, 282 at the desired position representative of the orientation of the flight path.

The coordinate rotation function of track resolver 277 can perhaps best be understood by reference to FIG. 1 and particularly to the aircraft 322 flying along the selected track 334 to way point 333. The initial information relative to the position of aircraft 332 is developed, in received data resolver 233, on the basis of the east-west and north-south coordinate X1 and Y1. The track resolver 277 operates effectively to rotate the coordinate system so that the information ultimately presented to the indicator means by which the pilot navigates is expressed in terms of rotated coordinates X2 and Y2. It is seen, therefore, that the track resolver has a dual function; it operates to sum up the way point bearing information from resolver 264 and the current position data from resolver 233, and at the same time rotates the information from those two resolvers to produce output signals in a coordinate system oriented along the projected track of the aircraft.

The signal developed in winding 281 of track resolver 277 is directly representative of the lineal displacement of the aircraft to the left or to the right of the selected track to the way point or destination toward which the aircraft is moving. This signal, after amplification in circuit 283 and detection in circuit 284, is supplied to the meter movement or motor 297 that drives the left-right indicator 54A in instrument 52A. The signal supplied to the "motor" 297 is a DC signal, the amplitude of the required movement being represented by the amplitude of the signal and the direction of movement by the polarity of the signal.

The rate of response of motor 297, and hence the rate of movement of indicator 54A, is limited to a preselected maximum by the limiter circuit 298. The two diodes 299 and 301 effectively set a maximum limit for the amplitude of the signal; typically, if silicon diodes are employed, this limit is established at about 0.6 volt whereas if germanium diodes are utilized the signal amplitude limitation is of the order of 0.3 volts. For any input signal equal to or exceeding this amplitude limitation, the signal supplied to motor 297 is the time integral of the received signal at an integration rate established by the size of the capacitors 303 and 304 and the impedance of the resistor 302. For normal en route flight, switch 305 is closed so that the capacitor 304 is effective in the integrating circuit.

Limiter circuit 298 should be constructed or adjusted to fit the normal operating speed range of the aircraft in which it is installed. This can be accomplished by specific selection of resistor 302 and capacitors 303 and 304 to provide an integration rate, and hence a response rate, correlated to the maximum speed of the aircraft. On the other hand, a standardized unit may be constructed for use in all aircraft, in which case the resistor 302 or the capacitor 304, or both, may be adjustable devices, permitting adjustment of the limiter circuit to meet the actual navigation requirements of the aircraft.

It will be apparent that limiter 298 functions in exactly the same manner as described above with respect to limiter 33 in FIGS. 3 and 4, establishing a maximum response speed for the left-right deviation indicator means 54A in instrument 52A. Because the signal information that is translated into movements of indicator 54A is in terms of lineal displacement, regardless of the angular position of the aircraft with respect to the navigational station, movements of indicator 54A are always in terms of aircraft movements in miles per hour. Thus, and as described above in connection with the embodiments of FIGS. 3 and 4, establishment of a fixed maximum rate of response for the indicator 54A automatically and inherently limits the instrument response rate in accordance with the actual navigation requirements of the aircraft, so long as the maximum limit is properly related to the speed of the aircraft.

The control arrangement for the to and from indicator 53A of instrument 52A is essentially similar to that for the left-right deviation indicator 54. Thus, the output signal from track resolver winding 282 is amplified in circuit 285 and detected in circuit 286. The resulting DC signal is supplied through limiter 292 to the meter movement or motor 291 in the RSI instrument. Again, the two diodes 293 and 294 establish a fixed maximum for the signal supplied to the indicator means. Moreover, this signal is integrated, with respect to time, for signal levels above the maximum, in the RC integrating circuit 295–296. By proper selection of capacitor 296 and resistor 295, relative to the voltage characteristics of diodes 293 and 294, the limiter circuit effectively establishes a maximum response rate for movements of the to-from indicator means 53A that is directly correlated to the navigational needs of the aircraft.

It should be noted that the RSI indicator 52A (FIG. 10) affords a representation that is reversed relative to the pictorial display indicator 52 (FIG. 4). Thus, in FIG. 10 the intersection of indicators 53A and 54A represents the way point toward which the aircraft moves. The central indicator element 55A represents the aircraft. Member 55A may be connected to the aircraft compass for rotation to indicate the heading of the aircraft.

In the computer navigation system 200, it is significant that "smoothing" of the bearing data from VOR receiver is carried out in two places in the circuit. The initial smoothing or filtering action occurs in the servo loop comprising control transformer 239, servomotor 248, and tach generator 254. This "pre-encoding" smoothing or filtering of the relatively short-duration high-amplitude transients frequently present in the output of VOR receiver 32 is quite desirable, substantially enhancing the usability of the bearing information supplied to received data resolver 233. But the pre-encoding smoothing of the bearing signal information is accomplished without reference to displacement from the navigation station and without specific reference to the speed range of the aircraft and hence does not realize the full advantages of the present invention.

The second smoothing or filtering operation accomplished in limiters 292 and 298 is directly correlated with the aircraft speed range and with the displacement of the aircraft from the navigation station. In theory, the response rate limitations imposed by the response rate control means 292, 298 is sufficient to achieve the desired enhancement of accuracy and usability of the bearing data. In practice, the system illustrated in FIG. 10, with some smoothing accomplished prior to encoding in the data resolver 233 and some accomplished afterward, tends to produce more consistent and accurate results.

During the time in which the aircraft flys down the selected track to a particular way point, capacitor 304 remains connected in limiter circuit 298. At the first way point on a flight, however, the pilot must re-set system 200 for a further way point and, usually, must encode the system to a different VORTAC station. The time delay in response of the left-right indicator 54A that is caused by the presence of capacitor 304 in the circuit may be too great to allow for easy adjustment of the system by the pilot. With capacitor 304 in the circuit, it may take as much as ten to twenty seconds for system adjustment, whereas the delay should be held to five seconds or less to enable the pilot to complete encoding in a reasonable and expeditious manner. It is for this reason switch 305 is provided, permitting the pilot to disconnect capacitor 304 and thereby achieve a marked increase in the response rate of the RSI instrument, and particularly indicator 54A, when setting the system for a new way point or course. Switch 305 is also opened to increase the response rate when the aircraft is maneuvering in a terminal area, to permit more rapid response of the instrument for landing approach purposes.

The rectilinear situation indicator 52A, as actuated by the system 200 of FIG. 10, comprises two individual indicator means, both of which indicate course deviations of the aircraft and both of which utilize, in part, both the original bearing signal developed by VOR receiver 32 and the distance signal from DME receiver 34. Thus, the indicator element 53A is ordinarily controlled, in substantial part, by the bearing signal as well as the distance signal, since the computer portion of system 200 requires both signals to resolve the relative position of the aircraft into rectilinear coordinates and to present the same on the basis of the predetermined track set into resolver 277. Thus, correction and compensation for erratic excursions in both navigation signals is important with respect to both of the indicator means 53A and 54A of device 52A, and it is for this reason that the two control means 292 and 298 for limiting the maximum response rate of the indicator means are incorporated in the system.

In selecting the limiting maximum rate of response for the indicator instrument or other indicator means in any of the systems described above, a determining factor is the maximum operating speed of their aircraft. However, the limiting response rate for the instrument or other indicator means should not be selected to be actually matched to the maximum speed of the aircraft. For example, if the full scale width of the display field for instrument 52A is set to be equal to four miles, by scale factor setting 274, and the maximum speed of the aircraft is four miles per minute, the response rate for indicator 54A should not be limited to a rate that will require a full minute for the indicator element to traverse the full width of the instrument. Instead, a maximum rate representative of a somewhat higher aircraft speed should be selected, to permit effective operation of the aircraft navigation system when the aircraft has a tailwind of reasonable magnitude. For high-altitude high-speed aircraft, such as jet aircraft capable of speeds in excess of six hundred miles per hour, which may operate in a jetstream, the maximum response rate for the indicating means should be equivalent to the maximum speed of the aircraft plus an additional increment of the order of one hundred fifty miles per hour to permit effective operation with a jetstream tailwind. For lower speed aircraft restricted to operation at lower altitudes, a smaller additional increment can be added to the actual maximum aircraft speed in determining the limiting rate for instrument response.

As noted above, system 200 of FIG. 10 includes a warning circuit 257 that is connected to the input winding 255 of tachometer generator 254. Warning circuit 257 is also connected to the rotor winding 241 of control transformer 239, through an amplifier 331. In addition, electrical connections are provided from DME receiver 34 and VOR receiver 32 to warning circuit 257.

FIG. 11 is a detail circuit diagram of one form of warning circuit 257, and of amplifier 331, with other components of system 200 illustrated also. As shown therein, amplifier 331 comprises a transistor 341 having its base electrode connected to the central terminal of a voltage divider comprising two resistors 342 and 343. Resistor 342 is connected back to the secondary winding 241 of control transformer 239. Resistor 343 is returned to ground.

The emitter electrode of transistor 341 is grounded. The collector electrode of the transistor is connected to the operating coil 344 of a rapid-scan relay 345. The other terminal of coil 344 is connected to an appropriate DC supply designated in FIG. 11 as B+. A relatively large capacitor 346 is connected in parallel with the relay coil.

Relay 345 further includes a movable contact 347 that engages a first fixed contact 348 when the relay is de-energized but that closes upon a second fixed contact 349 upon energization of the relay coil. Movable contact 347 is connected to system ground. Fixed contact 348 is connected to the input winding 255 of tachometer generator 254 (see FIG. 10). Fixed contact 349 (FIG. 11) is connected to one terminal of a warning signal meter movement 351, the other terminal of meter movement 351 being connected to ground. The meter movement actuates a warning device, indicated generally by a flag 352.

Warning circuit 257 further includes an additional relay 353 comprising an operating coil 354 that is connected to DME receiver 34. Relay 353 includes a fixed contact 355 that is connected to the fixed contact 349 of relay 345. When the relay is energized, fixed contact 355 is engaged by a movable contact 356 that is connected to the VOR receiver 32. Upon de-energization of relay 353, however, contacts 355 and 356 open.

In normal operation of warning circuit 357, FIG. 11, relay 353 is maintained energized by the output signal from DME receiver 34. Consequently, contacts 355 and 356 are held closed and meter movement 351 receives an energizing signal from VOR receiver 32. If, at any time, the output from the VOR receiver fails, meter movement 351 is de-energized. This causes the flag 352, normally held out of sight by the energized meter movement, to move to a visible position, indicating to the pilot that reception of a navigation signal has been interrupted.

Similarly, if the output from DME receiver 34 fails, contacts 355 and 356 open, interrupting the energizing circuit for device 351. Under these circumstances, flag 352 again moves to a visible position and warns the pilot that there has been an interruption in reception of one of the critical navigation signals.

For normal error signals developed across the secondary winding 241 of control transformer 239, the output signal from amplifier 331 is insufficient to energize the relay 345. But when the error signal on winding 241 reaches a given amplitude, which may, for example, be representative of a bearing deviation of five degrees, the error signal as amplified by circuit 331 reaches an amplitude sufficient to actuate the rapid scan relay. It is also necessary that this signal endure for a substantial period of time, sufficient to charge the relatively large capacitor 346. When both conditions obtain, indicative of a substantial error in the bearing-determining portion of computer system 200, the relay 345 is actuated, opening contacts 348 and 347 and closing contacts 347 and 349.

The closing of contacts 347 and 349 effectively shunts meter movement 351 to ground, thereby de-energizing the solenoid. Accordingly, flag 352 moves to its visible or warning position to warn the pilot of occurrence of an error condition. The opening of contacts 347 and 348, on the other hand, interrupts the normal input circuit to tachometer generator 254 by opening the circuit to its winding 255. Since the tachometer generator (FIG. 10) now has no input, it cannot produce the negative feedback signal that has previously served as a limit upon the rotational speed of servomotor 248. Consequently, until the error that actuated relay 345 in the first place is corrected, servomotor 248 remains free to operate at its maximum rate and thereby clear up the error as quickly as possible.

In all of the embodiments of the present invention that are described above, the local sources of navigation signals, the VOR receiver and the DME receiver, are treated as conventional apparatus requiring no modification for incorporation in the inventive system. However, it is also quite possible to apply the present invention to the navigation signal receivers; more specifically, it is quite possible to achieve many of the advantages of the present invention by modification of the detector circuitry for the VOR receiver.

The phase-bearing thirty cycle signal that is the key to effective operation of a VOR system is generated in the receiver in response to the direction asymmetry of the rotating directional RF carrier radiator at the navigation station. But parasitically excited radiating elements located in the flux field of the primary antenna become an important part of the antenna itself. The effect of these parasitic elements on the directional characteristics of the primary antenna vary in a complex manner with spacing, tuning, direction, and other factors, and produce much of the observed "roughness" in VOR signals.

One aspect of VOR radiation patterns that is generally easy to predict but quite difficult to specify in detail is the RF standing wave nature of the flux in the presence of numerous re-radiating objects. With VOR wavelengths of the order of nine feet and with aircraft speeds varying from one hundred to over six hundred miles per hour, standing wave-patterns result in space-amplitude modulation of the received signal at frequencies covering a range from zero to something like one hundred cycles per second. Space modulation is also produced by the motion of an aircraft through the penumbra zone of diffraction associated with obstructions that do not actually re-radiate the VOR signal. And Doppler shifts, resulting from relative motion between multiple signal paths, also produce amplitude modulation of the received signal in the same range of modulation frequencies.

Figure 12:
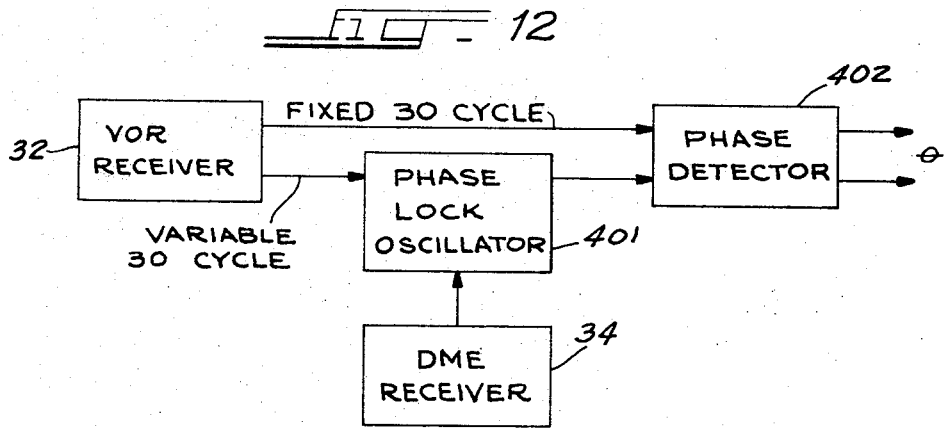
FIG. 12 illustrates, in block diagram form, a circuit modification that may be made in the bearing signal receiver of an aircraft navigation system and that may be advantageously incorporated in systems constructed in accordance with the present invention.

FIG. 12 illustrates a navigation signal correcting and compensating system applied to the detector stage of the VOR receiver 32 and comprising a further embodiment of the present invention. In the system of FIG. 12, the fixed-phase thirty cycle output of the VOR receiver 32 is connected directly to a phase detector 402. The variable phase thirty cycle output of the receiver is connected to the input circuit of a phase-lock oscillator 401, the output of which is supplied to phase detector 402. Phase-lock oscillator 401 is also connected to the DME receiver 34.

Phase-lock oscillator 401 may comprise any of a variety of known circuits of this general kind, which oscillate at a predetermined fixed frequency but which can be locked in phase to a received signal of the same frequency. In this instance, the phase lock is accomplished with respect to the variable thirty cycle signal from VOR receiver 32. Perhaps the most widely known use of phase lock oscillators of this general kind is in television receivers, where they are usually used in the synchronizing signal circuit. The phase lock oscillator possesses a substantial flywheel effect. Thus, loss of a few cycles of the variable thirty cycle input from VOR receiver 32 does not interrupt the output from the phase lock oscillator. Moreover, a transient phase shift in the variable thirty cycle input does not instantly change the phase of the output from the oscillator that is applied to phase detector 402.

The degree to which the phase lock oscillator 401 is locked to the variable thirty cycle input from VOR receiver 32 is also subject to variation, and this is the purpose of the connection to DME receiver 34. Thus, when the aircraft is at a substantial distance from the navigation station, the output signal from receiver 34, which may be an electrical signal or a mechanical signal, conditions the oscillator 401 for operation with a relatively strong flywheel effect. Stated differently, under these circumstances the phase lock oscillator output does not change in phase except in response to a relatively sustained change in the phase of the input signal from VOR receiver 32. On the other hand, when the aircraft is quite close to the navigation station, and rapid changes in bearing must be achieved, the output signal from DME receiver 34 conditions oscillator 401 for a tightly clamped operation, in relation to the variable thirty cycle input from receiver 32, so that phase detector 402 can follow the rapid and continuous bearing changes that occur in this area.

The present invention can be analyzed in terms of the application of appropriate low-pass filters to an aircraft navigation system to limit the effective response rate of the system to a given maximum determined by the speed range of the aircraft in which the system is used. In effect, the systems of the invention extend the response period of the navigation apparatus approximately to the maximum that will still permit full utilization of the navigation signals. In the process, extraneous erratic "information," really nothing but "noise," is eliminated. In a navigation system providing automatic or servo driven indicators, the navigation signal is, in effect, filtered by control of the servo slewing rate. Examples of this technique are given in FIGS. 5, 6, 7 and 9 and in the initial filtering servo comprising servo motor 248 in FIG. 10. On the other hand, direct electrical control means, such as the circuits discussed above in connection with FIGS. 3, 4 and 8, and the control means 292 and 298 in FIG. 10, can be employed. A further example of an electrical application of the invention is the VOR receiver modification of FIG. 12.

In all of the systems of the invention, the response rate of the indicator means of the navigation system is effectively limited to a given maximum that is determined in accordance with the speed range of the aircraft, making proper allowance for possible tailwinds. Furthermore, provision is made for incorporation in the navigation system of some form of distance modifying means for automatically modifying the maximum response rate of the indicator as an inverse function of the distance of the aircraft from the navigation station. In some embodiments of the invention, this distance-modifying means operates directly to control some mechanical or electrical element that determines the indicator response rate as, for example, the variable slewing rate servo system of FIG. 5. In other embodiments, distance modification is achieved by compounding the bearing signal with the distance signal and then establishing a fixed maximum rate for the response of the indicator, a fixed maximum which is related to the speed range of the aircraft. In all embodiments, the response rate of the aircraft instrumentation is proportioned to the actual navigational needs of the aircraft.

The "speed range" of the aircraft, as that term is used in this specification and in the appended claims, refers to the normal maximum speed of the aircraft in generally level flight plus an anticipated maximum tailwind, as discussed above. Thus, the speed range of the aircraft is representative of the maximum normal ground speed of the aircraft and corresponds approximately to the maximum speed of the aircraft relative to a fixed navigation station. The speed range of the aircraft does not refer to unusually high speeds reached in diving or other aerobatic maneuvers.

Hence, while preferred embodiments of the invention have been described and illustrated, it is to be understood that they are capable of variation and modification.

We claim:

1. An aircraft navigation system comprising:
 constant deviation indicator means for indicating changes in position of an aircraft;
 receiver means for developing a navigation signal in response to a received signal from a navigation station;
 coupling means coupling said receiver means to said indicator means to actuate said indicator means in accordance with said navigation signal;
 and a correcting and compensating system comprising control means for limiting the response rate of said indicator means to a given maximum rate determined by the speed range of the aircraft.

2. In an aircraft navigation system of the kind comprising indicator means for indicating changes in position of an aircraft, receiver means for developing a navigation signal in response to a received signal from a navigation station, and coupling means coupling said receiver means to said indicator means to actuate said indicator means in accordance with said navigation signal, a correcting and compensating system comprising control means for limiting the response rate of said indicator means to a given maximum rate determined by the speed range of the aircraft, and distance modifying means for automatically modifying said maximum response rate as an inverse function of the distance of the aircraft from the navigation station.

3. An aircraft navigation correcting and compensating system according to claim 2, in which said coupling means comprises an electrical coupling circuit interposed between said receiver means and said indicator means, said indicator means comprises an electrical-signal-actuated indicating instrument, and said control means comprises a capacitance effectively connected across the input terminals of said instrument and a current-limiting circuit coupled to said capacitance to limit the charging rate of said capacitance, and thereby limit the response rate of said instrument to a given maximum rate.

4. An aircraft navigation correcting and compensating system according to claim 3, in which said current-limiting circuit comprises a series resistance affording, with said capacitance, an R–C integrating circuit having a given time constant, and diode means connected to the input to said integrating circuit to limit the charging current to said capacitance to a given maximum amplitude, said maximum amplitude and said time constant determining the maximum charging rate of said capacitance.

5. An aircraft navigation correcting and compensating system according to claim 4 in which said diode means comprises two substantially identical diodes each connected across the input to said R–C integrating circuit but with opposite polarities.

6. An aircraft navigation correcting and compensating system according to claim 3, including switch means for disconnecting said capacitance from said instrument to effectively increase the response rate of said instrument above said maximum response rate to facilitate encoding of said navigation system.

7. An aircraft navigation correcting and compensating system according to claim 3 in which said current limiting circuit comprises a pair of input terminals and a pair of output terminals, said capacitance being coupled across said output terminals, at least one solid-state electric discharge device having input, output and control electrodes and having its input and output electrodes connected in series between one input terminal and one output terminal of said device, bias means connected between one input terminal and said control electrode for applying a bias voltage between said control electrode and said input electrode to bias said discharge device toward conduction, and a sensing impedance connected between said one input terminal and said input electrode to develop a control voltage, proportional to the current between the input and output electrodes, tending to render said device non-conductive whenever said discharge current reaches a predetermined value without substantially affecting said current for lower values.

8. An aircraft navigation correcting and compensating system according to claim 2 in which said control means comprises an electrical current limiting circuit having a pair of input terminals and a pair of output terminals, at least one solid-state electric discharge device having input, output and control electrodes and having its input and output electrodes connected in series between one input terminal and one output terminal of said circuit, bias means connected between one input terminal and said control electrode for applying a bias voltage between said control electrode and said input electrode to bias said discharge device toward conduction, and sensing means comprising a sensing impedance connected between said one input terminal and said input electrode to develop a control voltage, proportional to the current between the input and output electrodes, tending to render said device non-conductive whenever said discharge current reaches a predetermined value without substantially affecting said current for lower values.

9. An aircraft navigation correcting and compensating system according to claim 8, comprising two substantially identical discharge devices, provided with substantially identical bias means and sensing impedances, connected in opposite polarities between said input and output terminals.

10. An aircraft navigation correcting and compensating system according to claim 8, in which at least one of said bias and sensing means is adjustable, and in which said distance-modifying means comprises means for the adjustment thereof.

11. An aircraft navigation system according to claim 1, in which said coupling means comprises a servo drive interposed between said receiver means and said indicator means, and in which said control means comprises means for limiting the slewing rate of said servo drive to a given maximum rate determined by the speed range of the aircraft.

12. An aircraft navigation correcting and compensating system according to claim 2, in which said coupling means comprises a servo drive interposed between said receiver means and said indicator means, and in which said control means comprises means for limiting the slewing rate of said servo drive to a given maximum rate determined by the speed range of the aircraft.

13. An aircraft navigation correcting and compensating system according to claim 2, in which said receiver means is a bearing signal receiver that develops a bearing signal, said navigation system further including distance signal receiver means for developing a distance signal representative of distance of the aircraft from the navigation station, said coupling means comprising a servo drive interposed between said bearing signal receiver means and said indicator means, said control means comprising a signal-responsive servo control device for controlling the slewing rate of said servo drive, and said distance modifying means comprising means for applying said distance signal to said servo control device to modify the slewing rate of said servo drive as an inverse function of the distance of the aircraft from the navigation station.

14. An aircraft navigation correcting and compensating system according to claim 13 in which said servo control device comprises a variable ratio drive unit.

15. An aircraft navigation correcting and compensating system according to claim 13 in which said servo control device comprises a tachometer generator driven by and electrically coupled back to a servomotor in a negative feedback circuit, and in which said distance signal effectively varies the impedance of said feedback circuit.

16. An aircraft navigation correcting and compensating system according to claim 13 in which said servo control device comprises a pulser gate circuit connected in the power input to a servomotor in said servo drive and in which said distance signal is applied to said pulser gate circuit to vary the pulse repetition rate of power input signals supplied to said servomotor through said gate circuit.

17. An aircraft navigation correcting and compensating system according to claim 13 in which said servo control device comprises a tachometer generator driven by and electrically coupled to the power input of a servomotor in said servo drive, and in which the input signal to said tachometer generator is controlled directly by said distance signal.

18. An airborne aircraft navigation system comprising: first receiver means for developing a bearing signal in response to a received signal from a navigation station; second receiver means for developing a distance signal in response to a received signal from a navigation station; compounding means, coupled to both receivers, for combining said bearing and distance signals to develop a displacement signal representative of linear displacement of the aircraft from a given track; indicator means for indicating changes in position of the aircraft; coupling means, coupling said compounding means to said indicator means to actuate said indicator means in accordance with said displacement signal; and control means for limiting the response rate of said indicator means to a given maximum rate determined by the speed range of the aircraft.

19. An aircraft navigation system according to claim 18 in which said compounding means includes adjustable bias means for adding an adjustable constant bias to said displacement signal to effectively vary the track.

20. An aircraft navigation system according to claim 18 in which said compounding means comprises a computer for resolving said distance and bearing signals into two rectilinear coordinate signals, each of which constitutes a displacement signal representative of linear displacement of the aircraft from a given track, said system affording indicator means, coupling means, and control means for each of said coordinate signals as set forth in claim 18.

21. An aircraft navigation system according to claim 20 in which said computer comprises: a received data resolver for resolving said distance and bearing signals into a first pair of rectilinear coordinate signals representative of the aircraft position relative to the navigation station; a way point bearing resolver for developing a second pair of rectilinear coordinate signals representative of the position of a selected way point relative to said navigation station; and summing means for summing said two pairs of coordinate signals to develop two combined rectilinear coordinate signals representative of the aircraft position relative to said way point.

22. An aircraft navigation system according to claim 21 in which said summing means comprises a track resolver and means for rotating said track resolver in accordance with the bearing of a track between the aircraft position and the waypoint so that the combined rectilinear coordinate signals developed by said computer are oriented along the projected track of the aircraft to said way point.

23. An aircraft navigation system according to claim 18 in which said control means comprises two low pass filter devices, one interposed between said receiver means and said compounding means and the other incorporated in the input to said indicator means.

24. An aircraft navigation system according to claim 23 in which signals are translated through a part of the system by a servo drive, and in which one of said low pass filter devices constitutes means for limiting the slewing rate of the servo drive.

25. An aircraft navigation system according to claim 24 and further including means for detecting relatively high-amplitude long-duration excursions in said bearing signal, and means for disabling said slewing rate limiting means whenever such excursions occur.

26. An aircraft navigation correcting and compensating system according to claim 2 in which said navigation signal is a fixed-frequency A.C. signal of variable phase in which phase variations indicate changes in bearing of the aircraft, and in which said distance-modifying means comprises a distance signal receiver for developing a distance signal representative of a distance of the aircraft from the navigation station and an adjustable phase-lock circuit driven by said navigation signal and controlled by said distance signal to modify the degree to which said circuit is locked in phase to said navigation signal in inverse proportion to distance of the aircraft from the navigation station.

27. In an aircraft navigation system of the kind comprising indicator means for indicating changes in position of the aircraft, bearing signal receiver means for developing a variable phase-fixed frequency bearing signal in response to a received signal from a navigation station, distance signal receiver means for developing a distance signal representative of distance of the aircraft from the navigation station and coupling means coupling said bearing signal receiver means to said indicator means to actuate said indicator means in accordance with said bearing signal, distance modifying means, included in said coupling means, for automatically modifying the maximum response rate of the indicator means as an inverse function of the distance of the aircraft from the navigation station, said distance modifying means comprising an adjustable phase-lock circuit driven by said bearing signal and controlled by said distance signal to modify the degree to which said circuit is locked in phase to said navigation signal, a reference source of a constant phase signal at said fixed frequency, and a phase detector coupled to said reference source and said phase-lock circuit for developing a modified bearing signal for controlling said indicator means.

28. An aircraft navigation system according to claim 1 and further including means for detecting relatively high-amplitude long-duration excursions in said navigation signal, ahead of said control means in said correcting and compensating system, and means for at least partially disabling said control means whenever such excursions occur.

29. In an aircraft navigation system of the kind comprising receiver means for developing a bearing signal, converter means for converting said bearing signal into a linear deviation signal varying in amplitude with changes in distance of deviation from a preselected course, and linear deviation indicator means of given internal resistance for continuously displaying said linear deviation signal to indicate the deviation of the aircraft from its course, a compensating circuit comprising: a first small capacitor connected across said course deviation indicator to afford a minimum time delay in the response of said indicator means to permit relatively rapid response of said indicator means during encoding of the system; a second capacitor substantially larger than said first capacitor; and switching means for coupling said second capacitor in parallel with said first capacitor to increase said time constant of the integrating circuit materially for normal navigation of said aircraft.

30. A compensating circuit according to claim 29, and further comprising a current limiter circuit, connected in the input to said indicator means, for establishing a limiting maximum amplitude for the linear deviation signal applied to said indicator.

31. In an aircraft navigation system of the kind comprising receiver means for developing a bearing signal, converter means for converting said bearing signal into a linear displacement signal varying in amplitude with changes in distance from a preselected course, and a linear displacement indicator means for continuously utilizing said linear displacement signal to indicate the displacement of the aircraft from its course, a compensating circuit comprising: a synchro control transformer coupled to said receiver means; a servomotor electrically coupled to said control transformer for rotation in accordance with a bearing signal supplied thereto through said control transformer, said motor being mechanically connected back to said control transformer in a null-seeking servo circuit, said motor further being mechanically connected to said converter means effectively to apply said bearing signal to said converter means; signal generator means, driven by said motor, for developing a compensation signal having an amplitude and polarity representative of the rotational velocity of said motor; and a feedback means coupling said generator back to the input of said motor in an effective negative feedback circuit to reduce the effect of short-duration high-amplitude changes in said bearing signal as applied to said converter means.

32. An aircraft navigation compensating system incorporating the compensating circuit of claim 29, and further comprising a second compensating circuit comprising: a synchro control transformer coupled to said receiver means; a servomotor electrically coupled to said control transformer for rotation in accordance with a bearing signal supplied thereto through said control transformer, said motor being mechanically connected back to said control transformer in a null-seeking servo circuit, said motor further being mechanically connected to said converter means effectively to apply said bearing signal to said converter means; signal generator means, driven by said motor, for developing a compensation signal having an amplitude and polarity representative of the rotational velocity of said motor; and feedback means coupling said generator back to the input of said motor in a negative feedback circuit to reduce the effect of short-duration high-amplitude changes in said bearing signal as applied to said converter means.

33. In an aircraft navigation system which includes a receiver, responsive to a navigation beacon originating at a navigation station for developing a navigation signal, and an indicator, responsive to said navigation signal, for indicating the position of the aircraft, a correcting and compensating system comprising means for regulating the response rate of the indicator in proportion to the maximum angular velocity of the aircraft with respect to the station.

34. In an aircraft navigation system which includes a receiver, responsive to a navigation beacon, for developing a navigation signal, and an indicator, responsive to said navigation signal, for indicating the position of the aircraft, a correcting and compensating system comprising means for regulating the response rate of the indicator as an inverse function of the distance of the aircraft from the point of origin of the navigation beacon.

35. In an aircraft navigation system comprising a receiver, responsive to a navigation beacon for developing a navigation signal, an indicator responsive to said navigation signal for indicating the position of the aircraft, and a correcting and compensating system including control means for limiting the response rate of the indicator to a given maximum rate in accordance with the speed range of the aircraft, a safety system comprising:
  means for detecting relatively high-amplitude long-duration excursions in said navigation signal, ahead of said control means in said correcting and compensating system;
  and means for at least partially disabling said control means whenever said excursions occur.

References Cited

UNITED STATES PATENTS

| | | | |
|---|---|---|---|
| 2,439,044 | 4/1948 | Ferrill | 343—108 |
| 2,540,150 | 2/1951 | Watts | 244—77 |
| 2,892,180 | 6/1959 | Smith | 343—107 X |
| 2,936,136 | 5/1960 | Jofeh et al. | 244—77 |
| 2,943,321 | 6/1960 | Karpeles | 343—107 X |
| 3,034,032 | 5/1962 | McWilliams | 244—77 |
| 3,361,391 | 2/1968 | Medlinsk | 343—107 |

RODNEY D. BENNETT, *Primary Examiner.*

H. C. WAMSLEY, *Assistant Examiner.*